United States Patent
Ross et al.

(10) Patent No.: US 12,298,422 B2
(45) Date of Patent: May 13, 2025

(54) SYSTEMS AND METHODS FOR LOCALIZING DEVICES USING NETWORK SIGNATURES AND COVERAGE MAPS MEASURED BY ROBOTS

(71) Applicant: Brain Corporation, San Diego, CA (US)

(72) Inventors: David Ross, San Diego, CA (US); Botond Szatmary, San Diego, CA (US)

(73) Assignee: Brrain Corporation, San Diego, CA (US)

(*) Notice: Subject to any disclaimer, the term of this patent is extended or adjusted under 35 U.S.C. 154(b) by 421 days.

(21) Appl. No.: 17/592,127

(22) Filed: Feb. 3, 2022

(65) Prior Publication Data
US 2022/0155407 A1    May 19, 2022

Related U.S. Application Data

(63) Continuation of application No. PCT/US2020/045352, filed on Aug. 7, 2020.

(60) Provisional application No. 62/883,686, filed on Aug. 7, 2019.

(51) Int. Cl.
| G01S 5/02 | (2010.01) |
| G01S 5/00 | (2006.01) |
| G05D 1/00 | (2024.01) |

(52) U.S. Cl.
CPC .......... *G01S 5/0294* (2013.01); *G01S 5/0054* (2013.01); *G05D 1/0219* (2013.01); *G05D 1/0221* (2013.01); *G05D 1/0285* (2013.01)

(58) Field of Classification Search
CPC ... G01C 21/206; G01S 5/0054; G01S 5/0294; G05D 1/0219; G05D 1/0221; G05D 1/0274; G05D 1/028; G05D 1/0285
See application file for complete search history.

(56) References Cited

U.S. PATENT DOCUMENTS

| | | | |
|---|---|---|---|
| 2015/0160328 A1* | 6/2015 | Peinhardt | H04W 52/0251 455/456.3 |
| 2015/0312774 A1* | 10/2015 | Lau | H04W 16/20 455/446 |
| 2016/0353238 A1* | 12/2016 | Gherardi | G05D 1/102 |
| 2017/0212210 A1* | 7/2017 | Chen | G01S 5/06 |
| 2021/0258754 A1* | 8/2021 | Bolot | H04B 7/2606 |

OTHER PUBLICATIONS

International Search Report and Written Opinion for P23580WO00, dated Oct. 29, 2020.

* cited by examiner

*Primary Examiner* — Kashif Siddiqui
(74) *Attorney, Agent, or Firm* — Pierson Ferdinand LLP; Sidharth Kapoor

(57) ABSTRACT

Systems and methods for localizing devices using network signatures and coverage maps measured by robots are disclosed herein. According to at least one non-limiting exemplary embodiment, a robot may generate a coverage map based on measurements collected during operation of the robot. The coverage map generated by the robot may be temporally accurate such that a device may be localized within the coverage map based on a received network signature from the device. The network signature comprising a measure of amplitudes of Wi-Fi networks and/or cellular networks at a point within an environment of the coverage map.

17 Claims, 15 Drawing Sheets

SYSTEMS AND METHODS FOR LOCALIZING DEVICES USING NETWORK SIGNATURES AND COVERAGE MAPS MEASURED BY ROBOTS

PRIORITY

This application is a continuation of International Patent Application No. PCT/US20/45352 filed Aug. 7, 2020 claims the benefit of U.S. Provisional Patent Application Ser. No. 62/883,686 filed on Aug. 7, 2019, the entire disclosures of each of which are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application generally relates to robotics, and more specifically to systems and methods for localizing devices using network signatures and coverage maps measured by robots.

SUMMARY

The foregoing needs are satisfied by the present disclosure, which provides for, inter alia, systems and methods for localizing devices using network signatures and coverage maps measured by robots. Robots may provide consistent, accurate, and continuous measurements of coverage data within environments in which the robots operate such that localization using coverage maps is achievable. Accordingly, the systems and methods disclosed herein are directed towards a practical implementation of utilizing coverage data collected by robots to localize devices.

Exemplary embodiments described herein have innovative features, no single one of which is indispensable or solely responsible for their desirable attributes. Without limiting the scope of the claims, some of the advantageous features will now be summarized.

According to at least one non-limiting exemplary embodiment, a system is disclosed. The system comprises, at least one robot, a non-transitory computer-readable storage medium comprising a plurality of instructions stored therein, and at least one controller or processor configured to execute the plurality of instructions to, receive a coverage map of an environment, the coverage map being received based on network signature measurements collected by a sensor coupled to at least one robot, the coverage map being discretized into a plurality of regions, each region comprising an associated network signature; receive a second network signature from a device; determine a region of the coverage map comprising a network signature that is optimal or best match to the second network signature from the device; and localize the device within the environment to the determined region.

According to at least one non-limiting exemplary embodiment, the controller or processor is further configured to execute the plurality of instructions to, localize the device within a first region within the environment at a first time; localize the device within a second region within the environment at a second time, the second time being different from the first time; and determine a trajectory of the device based on a spatial and temporal difference between the first and second region and first and second times.

According to at least one non-limiting exemplary embodiment, the controller or processor is further configured to execute the plurality of instructions to, transmit a signal to the device upon localizing the device, the signal being based on at least one of a position of the device within the environment or a trajectory of the device.

According to at least one non-limiting exemplary embodiment, the network signature comprises at least in part a measure of amplitudes of at least one of one or more Wi-Fi networks or cellular network within the environment.

According to at least one non-limiting exemplary embodiment, the network signature further comprises a measure of relative amplitudes of the at least one of the one or more Wi-Fi networks or cellular networks within the environment.

According to at least one non-limiting exemplary embodiment, the network signature comprises a network identification, or service set ID (SSID), associated with each network of the network signature.

According to at least one non-limiting exemplary embodiment, the controller or processor is further configured to execute the plurality of instructions to produce an application programming interface (API) configured to interface between one or more external entities and the at least one controller or processor, the interfacing comprising the API receiving queries from the one or more external entities.

According to at least one non-limiting exemplary embodiment, the queries comprise a request for a location of a device based on a network signature received by the device, the location of the device being based on the coverage maps generated by the at least one robot.

According to at least one non-limiting exemplary embodiment, a method is disclosed. The method comprises at least one controller or processor of a server, receiving a coverage map of an environment, the coverage map being received based on network signature measurements collected by a sensor coupled to at least one robot, the coverage map being discretized into a plurality of regions, each region comprising an associated network signature; receiving a second network signature from a device; determining a region of the coverage map comprising a network signature that is optimal or best match to the second network signature from the device; and localizing the device within the environment to the determined region.

According to at least one non-limiting exemplary embodiment, the method further comprises the at least one controller or processor localizing the device within a first region within the environment at a first time; localizing the device within a second region within the environment at a second time, the second time being after the first time; and determining a trajectory of the device based on a spatial and temporal difference between the first and second region and first and second times.

According to at least one non-limiting exemplary embodiment, the method further comprises the at least one controller or processor transmitting a signal to the device upon localizing the device, the signal being based on at least one of a position of the device within the environment or a trajectory of the device.

According to at least one non-limiting exemplary embodiment, the network signature comprises at least in part a measure of amplitudes of at least one of one or more Wi-Fi networks or cellular network within the environment.

According to at least one non-limiting exemplary embodiment, the network signature further comprises a measure of relative amplitudes of the at least one of the one or more Wi-Fi networks or cellular networks within the environment.

According to at least one non-limiting exemplary embodiment, the network signature comprises a network identification, or service set ID ("SSID") associated with each network of the network signature.

According to at least one non-limiting exemplary embodiment, the method further comprises the at least one controller or processor utilizing an application programming interface (API) configured to interface between one or more external entities and the at least one controller or processor, the interfacing comprising of the API receiving queries from the one or more external entities.

According to at least one non-limiting exemplary embodiment, the queries comprise a request for a location of a device based on a network signature received by the device, the location of the device being based on the coverage maps generated by the at least one robot.

According to at least one non-limiting exemplary embodiment, a non-transitory computer-readable storage medium comprising a plurality of computer-readable instructions stored thereon is disclosed. The instructions, when executed by a controller or processor, configure the controller or processor to, receive a plurality of measurements of network signatures from one or more robots within an environment, the measurements comprising at least in part a measure of signal strength for at least one network within the environment, the measurements being collected by one or more sensors coupled to the one or more respective robots, the measurements being localized to a position of the robot during acquisition of the respective measurements; and generate a coverage map for the environment based on the measurements, the coverage map comprising a map of network signatures within the environment.

According to at least one non-limiting exemplary embodiment, the controller or processor is further configured to execute the plurality of computer-readable instructions to, receive a second network signature from a device, the second network signature comprising at least in part a measure of network signal strength for one or more networks; discretize the coverage map into a plurality of regions, each region comprising an associated network signature based on the measurements received from the one or more robots; and localize the device based on determining one or more regions comprises a network signature substantially similar to the second network signature from the device.

According to at least one non-limiting exemplary embodiment, the controller or processor is further configured to execute the plurality of computer-readable instructions to, localize the device at a first time to a first location; localize the device at a second time to a second location, the first time being different from the second time; and determine a trajectory of the device based on a spatial difference between the first location and second location and a temporal difference between the first time and second time.

According to at least one non-limiting exemplary embodiment, a system is disclosed. The system comprises, at least one robot, a non-transitory computer-readable storage medium comprising a plurality of instructions stored therein, and at least one controller or processor configured to execute the plurality of instructions to, receive a coverage map of an environment, the coverage map being received based on network signature measurements collected by a sensor coupled to at least one robot, the coverage map being discretized into a plurality of regions, each region comprising an associated network signature; receive a second network signature from a device; determine a region of the coverage map comprising a network signature that is optimal or best matche the second network signature from the device; localize the device within the environment to the determined region; and produce an application programming interface (API) configured to interface between one or more external entities and the at least one controller or processor, the interfacing comprising the API receiving queries from the one or more external entities, the queries comprising a request for a location of a device based on the second network signature received by the device, the location of the device being based on the coverage maps generated by the at least one robot; wherein, the network signature comprises at least in part a measure of amplitudes of at least one of one or more Wi-Fi networks or cellular network within the environment; the network signature further comprises a measure of relative amplitudes of the at least one of the one or more Wi-Fi networks or cellular networks within the environment; and the network signature comprising a network identification, or service set ID ("SSID"), associated with each network of the network signature.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

Figure 1A:
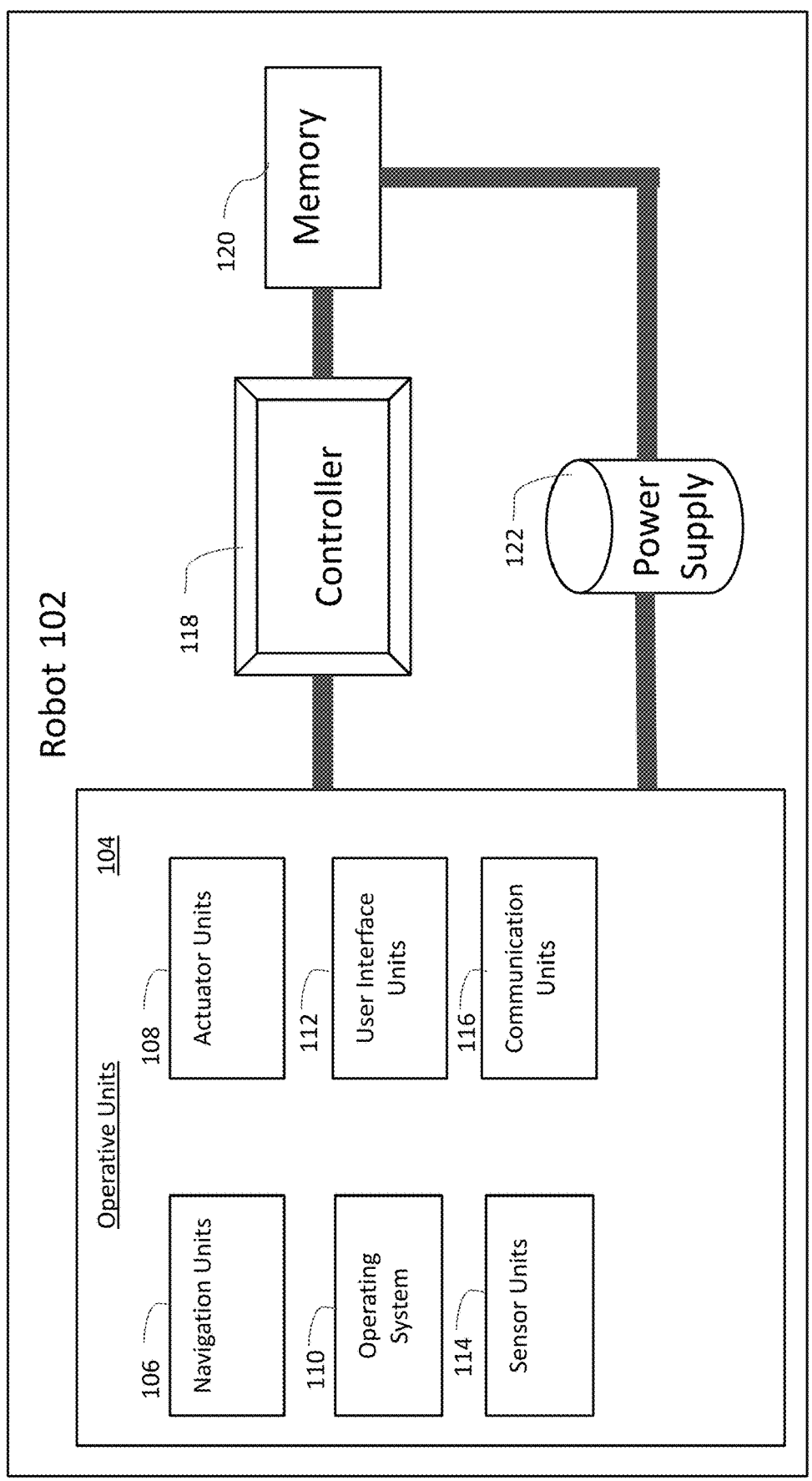
FIG. 1A is a functional block diagram of a main robot in accordance with some embodiments of this disclosure.

All Figures disclosed herein are © Copyright 2020 Brain Corporation. All rights reserved.

DETAILED DESCRIPTION

Currently, Wi-Fi and cellular coverage are measured and mapped by humans holding a sensor and walking around an environment collecting measurements using the sensor. The sensor may comprise a receiver sensitive to a plurality of network bandwidths such that the receiver may measure amplitudes of signal strength for each network within the environment. These measurements may be mapped in two- or three-dimensional space to generate a coverage map of the environment. Use of humans to measure this data, however, may be impractical and have drawbacks. The drawbacks and shortcomings may include such as, (i) inability of humans to accurately and continuously localize themselves within an environment, (ii) performing of tasks by humans being expensive from a cost and labor perspective, and (iii) the generated coverage measurements may not be temporally accurate over long periods of time as temporally accurate coverage maps require a human to re-measure the coverage at later times. Temporally accurate coverage maps generated constantly may be utilized to localize a device within an environment based on a network signature from the device.

Accordingly, there is a need in the art to localize devices using network signatures and coverage maps measured by robots, which provide technical solutions to such problems providing an improvement and technical advantage over such issues that are not met by conventional technology.

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for systems and methods for localizing devices using network signatures and coverage maps measured by robots. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), trailer movers, vehicles, and the like. Robots may also include any autonomous and/or semi-autonomous machine for transporting items, people, animals, cargo, freight, objects, luggage, and/or anything desirable from one location to another.

As used herein, a network signal may comprise a 3G signal (e.g., within the 1.8-2.5 GHz), 4G signal (e.g., within the 2-8 GHz bandwidth), a 5G signal, variants thereof (e.g., 5G NR, 5GPP, 4G LTE, 5GE, etc.), Wi-Fi signals (e.g., local networks), or any other wireless communication signal.

As used herein, signal strength may comprise a measure in decibels with respect to a milliwatt (dBm) of induced power from a wireless signal over an antenna (i.e., power, in milliwatts, of a received signal by an antenna), a signal to noise ratio (SNR) measure in decibels (dB), a received signal strength (RSS) measurement, a received signal strength indicator (RSSI) measurement, and/or received channel power indicator (RCPI) in accordance with IEEE-Std. 802.11, or variants thereof. Signal strength may further include connectivity parameters such as latency, jitter, and/or throughput, as will be discussed below.

As used herein, a coverage map may correspond to a function comprising signal strength of a network or many networks as a function of two-dimensional or three-dimensional space. Coverage maps may be generated using a plurality of measurements of signal strength, each measurement being localized to a position in two- or three-dimensional space, such that the signal strength values of the plurality of measurements and localization of the plurality of measurements may be utilized by a controller or processor to determine the signal strength function as a function of space.

As used herein, a network signature may include various parameters, also referred to herein as "network parameters," associated with one or more networks, network signals, and/or network interfaces. The network parameters may include, but are not limited to, frequency, reference signal strength, access point names ("APN") and bearer information (for use in, inter alia, LTE, eHRPD, or EvDO networks), public land mobile network ("PLMN," including GSM/2G, UMTS/3G, LTE/4G, offered by a single operator within a given country, often referred to as a "cellular network"), area codes, global cell ID, active SIM carrier names, network types (e.g., 2G, 3G, 4G, 5G, LTE, etc.), device models, platform types, signal strengths (RSRP, RSRQ, SNR, RSSI, etc.), download/upload throughput, download/upload latency, download/upload jitter, Wi-Fi SSID (i.e., a network name), international mobile equipment identity ("IMEI"), international mobile subscriber identity ("IMSI"), layer 3 ("L3") messages in GSM, non-access stratum ("NAS") messages (e.g., in universal mobile telecommunications services ("UMTS") and LTE telecommunications protocols) including QoS parameters, signaling messages, radio-resource control ("RRC") messages (including master information block ("MIB") and system information block ("SIB"), broadcast by eNodeB/HeNB), channel configuration messages, packet service data, transmission control protocol/internet protocol ("TCP/IP"), user datagram protocol ("UDP"), session initiation protocol ("SIP"), CDMA layer 1 messages (e.g., including SID, NID, BID, band class, channel, Rx power, Tx power, dominant, active and neighbor set PN and Eclo), LTE layer 1 messages (e.g., including RSRP, RS SNR, RSRQ, PCI, ECI, downlink EARFCN, uplink EARFCN, band, bandwidth, MCC/MNC, modulation schemes, MCS intex, TxMode, CQI, RSSI, and TxPower), WCDMA layer 1 messages (e.g., including RSSI, RSCP, Eclo, Active set and neighbor set measurements, Cell ID (node, RNC), LAC, RAC, UETxPower, UL interface, MCC/MNC, and downlink/uplink UARFCN), general layer 1 messages (e.g. including physical layer throughput, BLER, 5G voice codec type (e.g., AMR NB/WB), LTE voice codec type, WCDMA voice codec type, CDMA voice codec type, GSM voice codec type, LTE random access configuration and execution messages, intra/inter/IRAT handover configuration parameters and execution measurements, IRAT, cells, frequency, delays, and failures), other layer 1 messages (e.g., including carrier aggregation parameters, RF metrics for Pcell and Scell, activation/deactivation messages, throughput, HSDPA/HUSPA configuration parameters, activation/deactivation messages, EVDO configuration parameters (e.g., DRC intext, ASP PN), Rx/Tx power, Eclo, SINR, number of users, and TCH throughput), and/or similar parameters of a network or network interface (defined below). Such parameters may be measured or received using common sensors and/or Wi-Fi/cellular hardware and firmware coupled to a processor (e.g., a processor of a robot). Although the present disclosure may typically only mention a subset of these parameters, one skilled in the art may appreciate that any of these parameters may be utilized in defining a network signature, as discussed further below.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, 4G, or 5G including LTE/LTE-A/TD-LTE/TD-LTE, GSM, etc. variants thereof), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processing device such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die or distributed across multiple components.

As used herein, computer program and/or software may include any sequence or human or machine-cognizable steps which perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

The systems and methods of this disclosure at least, (i) enhance localization of devices within regions that robots operate; (ii) enable devices to be accurately and wirelessly localized indoors; (iii) improve usability of robots operating on a distributed network coupled to a cloud server; and (iv) improve human experience within environments comprising robots. Other advantages are readily discernible by one having ordinary skill in the art given the contents of the present disclosure.

According to at least one non-limiting exemplary embodiment, a system is disclosed. The system may comprise at least one robot; a non-transitory computer-readable storage medium comprising a plurality of instructions stored therein; and at least one controller or processor configured to execute the instructions to, receive a coverage map of an environment, the coverage map being received based on network signal strength measurements collected by a sensor of at least one robot, the coverage map being discretized into a plurality of regions, each region comprising an associated network signature thereto; receive a network signature from a device; determine a region of the coverage map comprising a network signature which is optimal or best match the received network signature from the device; and localize the device within the environment based on the determined region.

According to at least one non-limiting exemplary embodiment, the at least one controller or processor is further configured to localize the device within a first region within the environment at a first time; localize the device within a second region at a second time, the second time being different from the first time; and determine a trajectory of the device based on a spatial and temporal difference between the first and second regions and first and second times, respectively. In some instances, the at least one controller or processor may transmit a signal to the device upon localizing the device, the signal being based on at least one of a position of the device within the environment or the trajectory of the device.

According to at least one non-limiting exemplary embodiment, the network signature comprises a measure of amplitudes of at least one of one or more Wi-Fi networks or cellular networks within the environment. In some embodiments, the network signature may further comprise a measure of relative amplitudes of the at least one of the one or more Wi-Fi networks or cellular networks within the environment. In some embodiments, the network signature may further comprise a network identification associated with each network of the network signature.

According to at least one non-limiting exemplary embodiment, the system may further comprise an application programming interface (API) configured to interface between one or more external entities and the at least one controller or processor, the interfacing comprising the API receiving queries from the one or more external entities. The queries may comprise a request for a location of a device based on a network signature received from the device, the location being based on the coverage maps generated by the at least one robot.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processing devices (e.g., microprocessing devices) and other peripherals. As previously mentioned and used herein, processing device, microprocessing device, and/or digital processing device may include any type of digital processing device such as, without limitation, digital signal processing devices ("DSPs"), reduced instruction set computers ("RISC"), complex instruction set computers ("CISC"), microprocessing devices, gate arrays (e.g., field programmable gate arrays ("FPGAs")), programmable logic device ("PLDs"), reconfigurable computer fabrics ("RCFs"), array processing devices, secure microprocessing devices and application-specific integrated circuits ("ASICs"). Peripherals may include hardware accelerators configured to perform a specific function using hardware elements such as, without limitation, encryption/description hardware, algebraic processing devices (e.g., tensor processing units, quadratic problem solvers, multipliers, etc.), data compressors, encoders, arithmetic logic units ("ALU"), and the like. Such digital processing devices may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RL-DRAM"), static RAM ("SRAM"), flash memory (e.g., NAND/NOR), memristor memory, pseudostatic RAM ("PSRAM"), etc. Memory 120 may provide computer-readable instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the computer-readable instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processing device may be internal to or on board robot 102 and/or may be external to robot 102 and be communicatively coupled to controller 118 of robot 102 utilizing communication units 116 wherein the external processing device may receive data from robot 102, process the data, and transmit computer-readable instructions back to controller 118. In at least one non-limiting exemplary embodiment, the processing device may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processing devices. In some embodiments, a single controller (e.g., controller 118) may serve as the various controllers and/or processing devices described. In other embodiments different controllers and/or processing devices may be used, such as controllers and/or processing devices used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 includes at least navigation units 106, actuator units 108, user interface units 112, sensor units 114, and communication units 116. Operative units 104 may also comprise other units such as specifically configured task units (not shown) that provide the various functionality of robot 102. In exemplary embodiments, operative units 104 may be instantiated in software, hardware, or both software and hardware. For example, in some cases, units of operative units 104 may comprise computer-implemented instructions executed by a controller. In exemplary embodiments, units of operative unit 104 may comprise hardcoded logic (e.g., ASICS). In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators may actuate the wheels for robot 102 to navigate a route; navigate around obstacles; rotate cameras and sensors. According to exemplary embodiments, actuator unit 108 may include systems that allow movement of robot 102, such as motorized propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

Actuator unit 108 may also include any system used for actuating, in some cases actuating task units to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras including video cameras (e.g., red-blue-green ("RBG") cameras, infrared cameras, three-dimensional ("3D") cameras, thermal cameras, etc.), time of flight ("ToF") cameras, structured light cameras, antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, stacks, bags, etc. According to exemplary embodiments, the data structure of the sensor data may be called an image.

According to exemplary embodiments, sensor units 114 may be in part external to the robot 102 and coupled to communications units 116. For example, a security camera within an environment of a robot 102 may provide a controller 118 of the robot 102 with a video feed via wired or wireless communication channel(s). In some instances, sensor units 114 may include sensors configured to detect a presence of an object at a location such as, for example without limitation, a pressure or motion sensor may be disposed at a shopping cart storage location of a grocery store, wherein the controller 118 of the robot 102 may utilize data from the pressure or motion sensor to determine if the robot 102 should retrieve more shopping carts for customers.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102.

According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3.5G, 3.75G, 3GPP/3GPP2/HSPA+), 4G (4GPP/4GPP2/LTE/LTE-TDD/LTE-FDD), 5G (5GPP/5GPP2), or 5G LTE (long-term evolution, and variants thereof including LTE-A, LTE-U, LTE-A Pro, etc.), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), FireWire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

Communications units 116 may also be configured to measure various network parameters of one or more cellular and Wi-Fi networks to generate network signatures. Some network parameters may further require data from sensor units 114. As used herein, a network signature may include various parameters, also referred to herein as "network parameters," associated with one or more networks, network signals, and/or network interfaces. The network parameters may include, but are not limited to, frequency, reference signal strength, access point names ("APN") and bearer information (for use in, inter alia, LTE, eHRPD, or EvDO networks), public land mobile network ("PLMN," including GSM/2G, UMTS/3G, LTE/4G, offered by a single operator within a given country, often referred to as a "cellular network"), area codes, global cell ID, active SIM carrier names, network types (e.g., 2G, 3G, 4G, 5G, LTE, etc.), device models, platform types, signal strengths (RSRP, RSRQ, SNR, RS SI, etc.), download/upload throughput, download/upload latency, download/upload jitter, Wi-Fi SSID (i.e., a network name), international mobile equipment identity ("IMEI"), international mobile subscriber identity ("IMSI"), layer 3 ("L3") messages in GSM, non-access stratum ("NAS") messages (e.g., in universal mobile telecommunications services ("UMTS") and LTE telecommunications protocols) including QoS parameters, signaling messages, radio-resource control ("RRC") messages (including master information block ("MIB") and system information block ("SIB"), broadcast by eNodeB/HeNB), channel configuration messages, packet service data, transmission control protocol/internet protocol ("TCP/IP"), user datagram protocol ("UDP"), session initiation protocol ("SIP"), CDMA layer 1 messages (e.g., including SID, NID, BID, band class, channel, Rx power, Tx power, dominant, active and neighbor set PN and Eclo), LTE layer 1 messages (e.g., including RSRP, RS SNR, RSRQ, PCI, ECI, downlink EARFCN, uplink EARFCN, band, bandwidth, MCC/MNC, modulation schemen, MCS intex, TxMode, CQI, RSSI, and TxPower), WCDMA layer 1 messages (e.g., including RSSI, RSCP, Eclo, Active set and neighbor set measurements, Cell ID (node, RNC), LAC, RAC, UETxPower, UL interface, MCC/MNC, and downlink/uplink UARFCN), general layer 1 messages (e.g. including physical layer throughput, BLER, 5G voice codec type (e.g., AMR NB/WB), LTE voice codec type, WCDMA voice codec type, CDMA voice codec type, GSM voice codec type, LTE random access configuration and execution messages, intra/inter/IRAT handover configuration parameters and execution measurements, IRAT, cells, frequency, delays, and failures), other layer 1 messages (e.g., including carrier aggregation parameters, RF metrics for Pcell and Scell, activation/deactivation messages, throughput, HSDPA/HUSPA configuration parameters, activation/deactivation messages, EVDO configuration parameters (e.g., DRC intext, ASP PN), Rx/Tx power, Eclo, SINR, number of users, and TCH throughput), and/or similar parameters of a network or network interface.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used herein, a robot 102, a controller 118, or any other controller, processing device, or robot performing a task, operation or transformation illustrated in the figures below comprises a controller executing computer-readable instructions stored on a non-transitory computer-readable storage apparatus, such as memory 120, as would be appreciated by one skilled in the art.

Figure 1B:
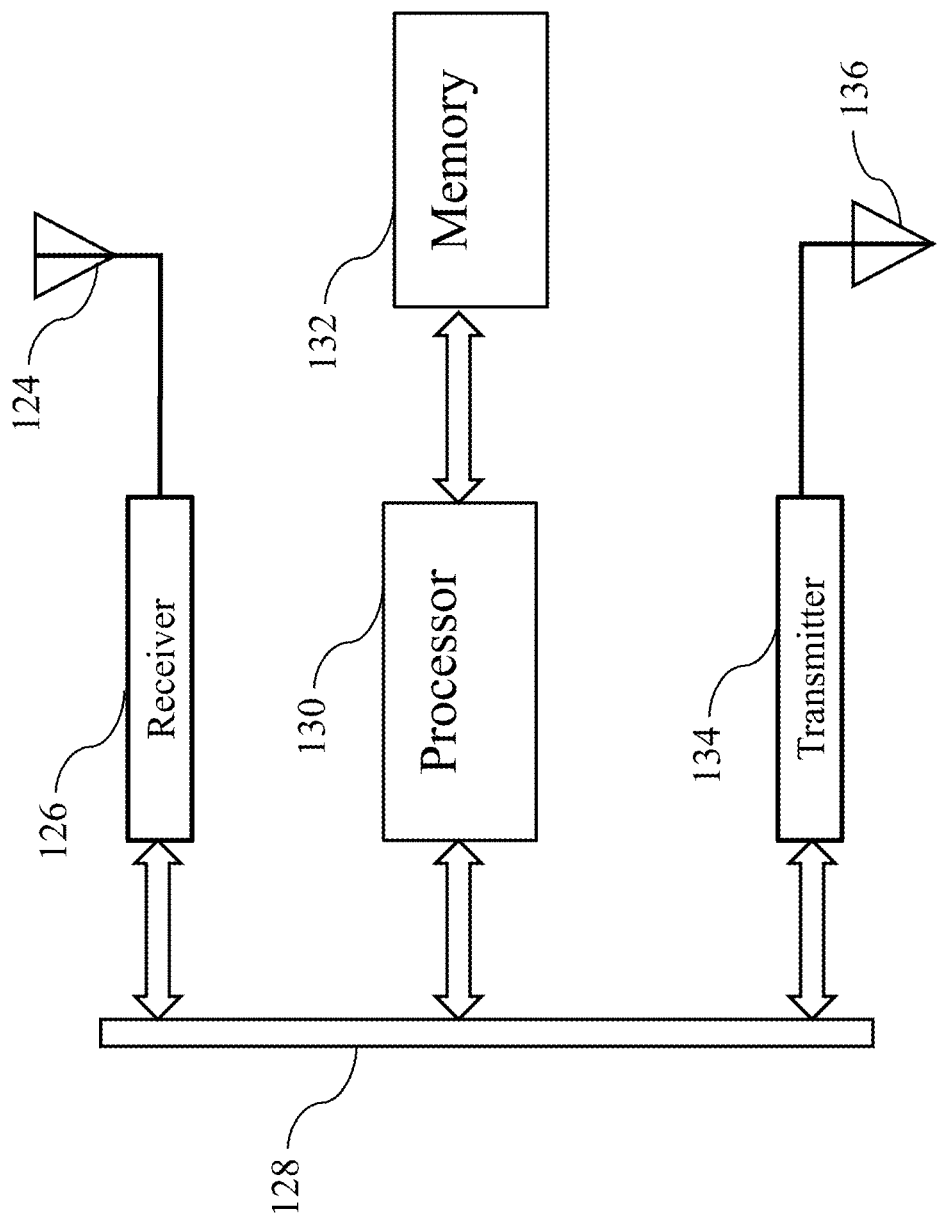
FIG. 1B is a functional block diagram of a controller or processor in accordance with some embodiments of this disclosure.

Next referring to FIG. 1B, the architecture of a processor or processing device 138 is illustrated according to an exemplary embodiment. As illustrated in FIG. 1B, the processing device 138 includes a data bus 128, a receiver 126, a transmitter 134, at least one processor 130, and a memory 132. The receiver 126, the processor 130 and the transmitter 134 all communicate with each other via the data bus 128. The processor 130 is configurable to access the memory 132 which stores computer code or computer-readable instructions in order for the processor 130 to execute the specialized algorithms. As illustrated in FIG. 1B, memory 132 may comprise some, none, different, or all of the features of memory 120 previously illustrated in FIG. 1A. The algorithms executed by the processor 130 are discussed in further detail below. The receiver 126 as shown in FIG. 1B is configurable to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing. The receiver 126 communicates these received signals to the processor 130 via the data bus 128. As one skilled in the art would appreciate, the data bus 128 is the means of communication between the different components—receiver, processor, and transmitter—in the processing device. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configurable to further communicate the output signals to a plurality of operative units 104 illustrated by signal output 136.

One of ordinary skill in the art would appreciate that the architecture illustrated in FIG. 1B may illustrate an external server architecture configurable to effectuate the control of a robotic apparatus from a remote location, such as server 202 illustrated next in FIG. 2. That is, the server may also include a data bus, a receiver, a transmitter, a processor, and a memory that stores specialized computer-readable instructions thereon.

One of ordinary skill in the art would appreciate that a controller 118 of a robot 102 may include one or more processing devices 138 and may further include other peripheral devices used for processing information, such as ASICS, DPS, proportional-integral-derivative ("PID") controllers, hardware accelerators (e.g., encryption/decryption hardware), and/or other peripherals (e.g., analog to digital converters) described above in FIG. 1A. The other peripheral devices when instantiated in hardware are commonly used within the art to accelerate specific tasks (e.g., multiplication, encryption, etc.) which may alternatively be performed using the system architecture of FIG. 1B. In some instances, peripheral devices are used as a means for intercommunication between the controller 118 and operative units 104 (e.g., digital to analog converters and/or amplifiers for producing actuator signals). Accordingly, as used herein, the controller 118 executing computer-readable instructions to perform a function may include one or more processing devices 138 thereof executing computer-readable instructions and, in some instances, the use of any hardware peripherals known within the art. Controller 118 may be illustrative of various processing devices 138 and peripherals integrated into a single circuit die or distributed to various locations of the robot 102 which receive, process, and output information to/from operative units 104 of the robot 102 to effectuate control of the robot 102 in accordance with instructions stored in a memory 120, 132. For example, controller 118 may include a plurality of processing devices 138 for performing high level tasks (e.g., planning a route to avoid obstacles) and processing devices 138 for performing low-level tasks (e.g., producing actuator signals in accordance with the route).

Figure 2:
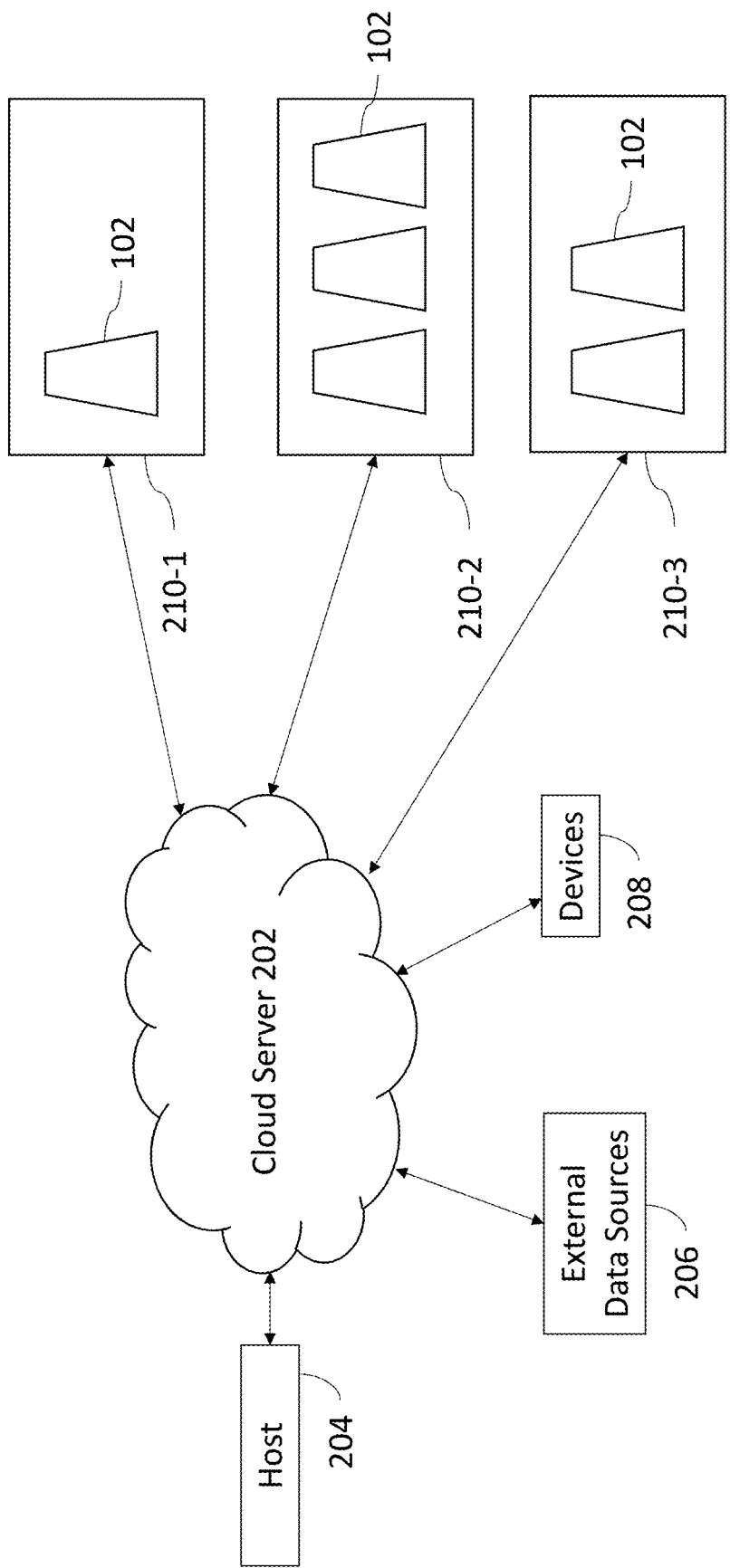
FIG. 2 is a functional block diagram of a cloud server and coupled devices thereto in accordance with some embodiments of this disclosure.

FIG. 2 illustrates a server 202 and communicatively coupled components 204, 206, 208, 210 thereof in accordance with some exemplary embodiments of this disclosure. The server 202 may comprise one or more processors 138 depicted in FIG. 1B above, each processor 138 may comprise at least one processor 130 and memory 132 therein in addition to, without limitation, any other components illustrated in FIG. 1B. The processing units may be centralized at a location or distributed among a plurality of devices (e.g., a dedicated server or a cloud server). Communication links between the server 202 and coupled devices may comprise wireless and/or wired communications, wherein the server 202 may further utilize one or more coupled antenna, relays, routers, etc. to effectuate the wireless communication. The server 202 may be coupled to a host 204, wherein the host 204 may correspond to a high-level entity (e.g., an administrator) of the server 202. The host 204 may, for example, upload software and/or firmware updates for the server 202 and/or coupled devices 208 and 210, connect or disconnect devices 208 and 210 to the server 202, or otherwise control operations of the server 202. External data sources 206 may comprise any publicly available data sources (e.g., public databases such as weather data from the National Oceanic and Atmospheric Administration ("NOAA"), satellite topology data, public records, etc.) and/or any other databases (e.g., private databases with paid or restricted access) of which the server 202 may access data therein. Devices 208 may comprise any device configured to perform a task at an edge of the server 202. These devices may include, without limitation, internet of things ("IoT") devices (e.g., stationary CCTV cameras, smart locks, smart thermostats, etc.), external processors (e.g., external CPUs or GPUs), and/or external memories configured to receive a sequence of computer-readable instructions provided at least in part by the server 202 and/or store large amounts of data.

Lastly, the server 202 may be coupled to a plurality of robot networks 210, each robot network 210 comprising at least one robot 102. In some embodiments, each network 210 may comprise one or more robots 102 operating within separate environments from other robots 102 of other robot networks 210. An environment may comprise, for example, a section of a building (e.g., a floor or room), an entire building, a street block, or any enclosed and defined space in which the robots 102 operate. In some embodiments, each robot network 210 may comprise a different number of robots 102 and/or may comprise different types of robot 102. For example, network 210-1 may only comprise a robotic wheelchair, and network 210-1 may operate in a home of an owner of the robotic wheelchair or a hospital, whereas network 210-2 may comprise a scrubber robot 102, vacuum robot 102, and a gripper arm robot 102, wherein network 210-2 may operate within a retail store. Alternatively, or additionally, in some embodiments, the robot networks 210 may be organized around a common function or type of robot 102. For example, a network 210-3 may comprise a plurality of security or surveillance robots that may or may not operate in a single environment but are in communication with a central security network linked to server 202. Alternatively, or additionally, in some embodiments, a single robot 102 may be a part of two or more networks 210. That is, robot networks 210 are illustrative of any grouping or categorization of a plurality of robots 102 coupled to the server.

Each robot network 210 may communicate data including, but not limited to, sensor data (e.g., RGB images captured, LiDAR scan points, network signal strength data from sensors 202, etc.), IMU data, navigation and route data (e.g., which routes were navigated), localization data of objects within each respective environment, and metadata associated with the sensor, IMU, navigation, and localization data. Each robot 102 within each network 210 may receive communication from the server 202 including, but not limited to, a command to navigate to a specified area, a command to perform a specified task, a request to collect a specified set of data, a sequence of computer-readable instructions to be executed on respective controllers 118 of the robots 102, software updates, and/or firmware updates. One skilled in the art may appreciate that a server 202 may be further coupled to additional relays and/or routers to effectuate communication between the host 204, external data sources 206, devices 208, and robot networks 210 which have been omitted for clarity. It is further appreciated that a server 202 may not exist as a single hardware entity, rather may be illustrative of a distributed network of non-transitory memories and processors. In some embodiments, a robot network 210, such as network 210-1, may communicate data, e.g. share route and map information, with other networks 210-2 and/or 210-3. In some embodiments, a robot 102 in one network may communicate sensor, route or map information with a robot in a different network. Communication among networks 210 and/or individual robots 102 may be facilitated via server 202, but direct device-to-device communication at any level may also be envisioned. For example, a device 208 may be directly coupled to a robot 102 to enable the device 208 to provide instructions for the robot 102 (e.g., command the robot 102 to navigate a route).

One skilled in the art may appreciate that any determination or calculation described herein may comprise one or more processors/controllers of the server 202, devices 208, and/or robots 102 of networks 210 performing the determination or calculation by executing computer-readable instructions. The instructions may be executed by a processor of the server 202 and/or may be communicated to robot networks 210 and/or devices 208 for execution on their respective controllers/processors in part or in entirety. Advantageously, use of a server 202 may enhance a speed at which parameters may be measured, analyzed, and/or calculated by executing the calculations (i.e., computer-readable instructions) on a distributed network of processors on robots 102 and devices 208. Use of a distributed network of controllers 118 of robots 102 may further enhance functionality of the robots 102 as the robots 102 may execute instructions on their respective controllers 118 during times when the robots 102 are not in use by operators of the robots 102.

Figure 3A:
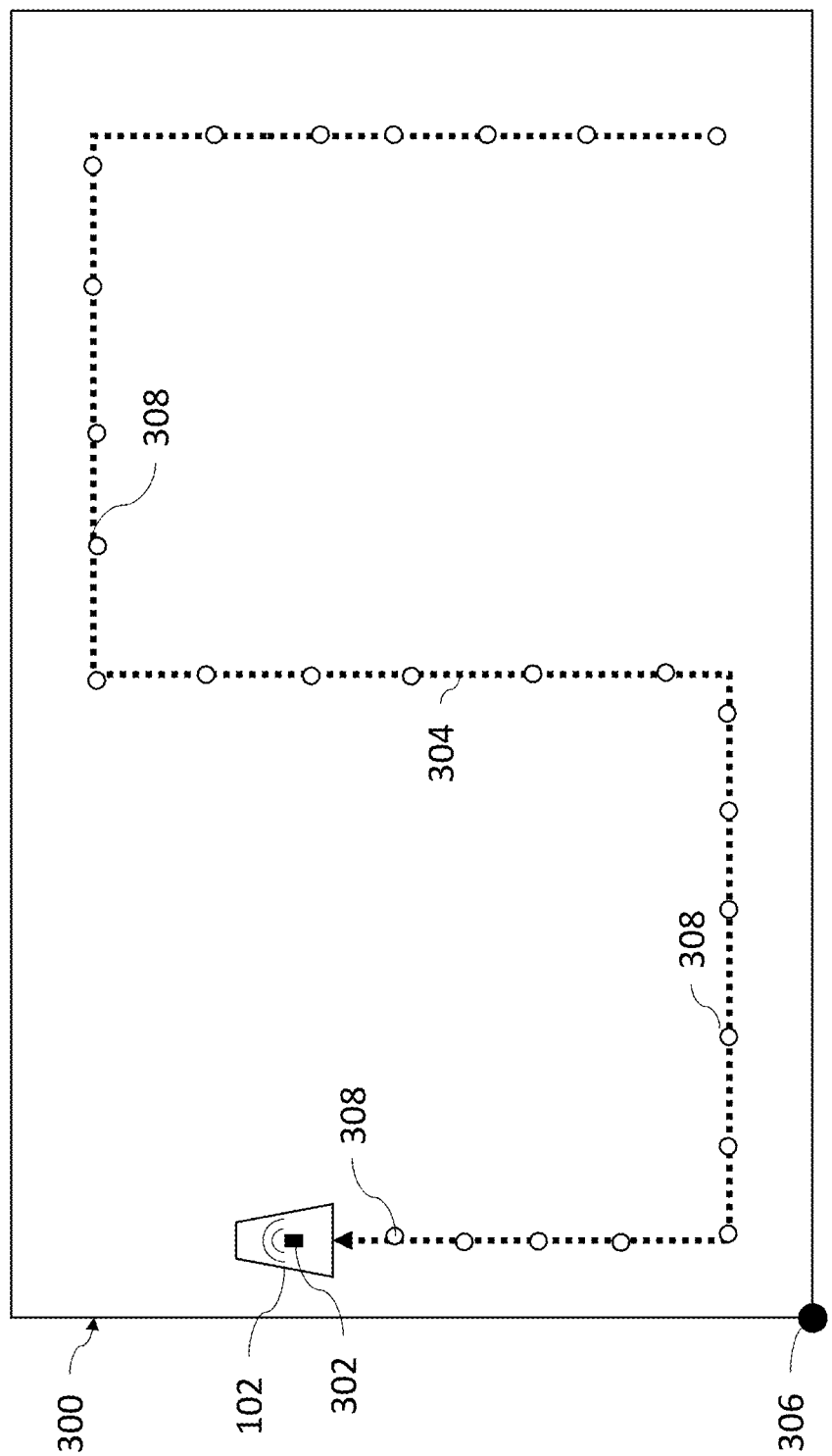
FIGS. 3A-B illustrate measurement of network signal strength within a building for use in mapping coverage within the building, according to an exemplary embodiment.

FIG. 3A illustrates a top view of a robot 102 comprising a network analyzing or spectrum analyzing sensor 302, configured to measure network signatures while the robot 102 is navigating a route 304 within a building 300, according to an exemplary embodiment. The sensor 302 is configured to measure various parameters of networks within the building 300 to produce network signatures, including signal strength of some or all 3G, 4G, or 5G specified bandwidths as well as some or all local Wi-Fi networks within the building 300 and/or other information/parameters relating to networks within the environment of the robot 102 to produce a network signature defined above. The robot 102 may be configured to navigate around the building 300 while performing its functions, such as cleaning the building if the robot 102 is a cleaning robot. As the robot 102 moves along a route 304, it may localize itself with respect to an origin or a home base 306 at all times such that network signature measurements 308 may be localized within the environment 300 based on the position of the robot 102. The localization is performed using any localization method understood within the art (e.g., using navigation units 106 and sensor units 114). Network signature measurements 308 may comprise measurements in terms of, for example, decibels with respect to a milliwatt (dBm), a signal to noise ratio (SNR), received signal strength indicator (RSSI), etc., of one or more 3G, 4G, or 5G specified bandwidths as well as one or more local Wi-Fi signals as well as any other parameters described above (e.g., SSID for Wi-Fi networks, CDMA/LTE/WCDMA/GSM layer 1 messages, etc.). By collecting these network signature measurements as the robot 102 navigates route 306, a controller 118 of the robot 102 (or separate controller, as depicted in FIG. 2 above) may map the network signal strength as a function of space. Space, as used herein, may comprise two-dimensional or three-dimensional space. The measurements of network signal strength may be utilized to, at least in part, generate a network signature corresponding to any location within the environment 300 at which the robot 102 has navigated.

It is appreciated that a sensor 302 of a robot 102 may collect a substantially large number of measurements 308 of network signatures (e.g., signal analyzer sensors may operate at 1 kHz or greater frequencies corresponding to 1,000 measurements 308 per second, or more), wherein only some of the measurements 308 have been illustrated for clarity. Use of a substantially large number of network parameters may further enhance an accuracy of a calculated coverage map illustrated next in FIG. 3B.

According to at least one non-limiting exemplary embodiment, the building 300 may comprise multiple robots 102 operating therein. Multiple robots 102 comprising a sensor 302 and operating within the building 300 may further enhance a determined coverage map for the building 300, illustrated next in FIG. 3B, by providing a processor (e.g., processor of a server 202) with additional measurements 308 to generate the coverage map.

According to at least one non-limiting exemplary embodiment, the building 300 may further comprise objects therein, which have been omitted for clarity. It is additionally appreciated that the size and shape of building 300 is not intended to be limiting.

Figure 3B:
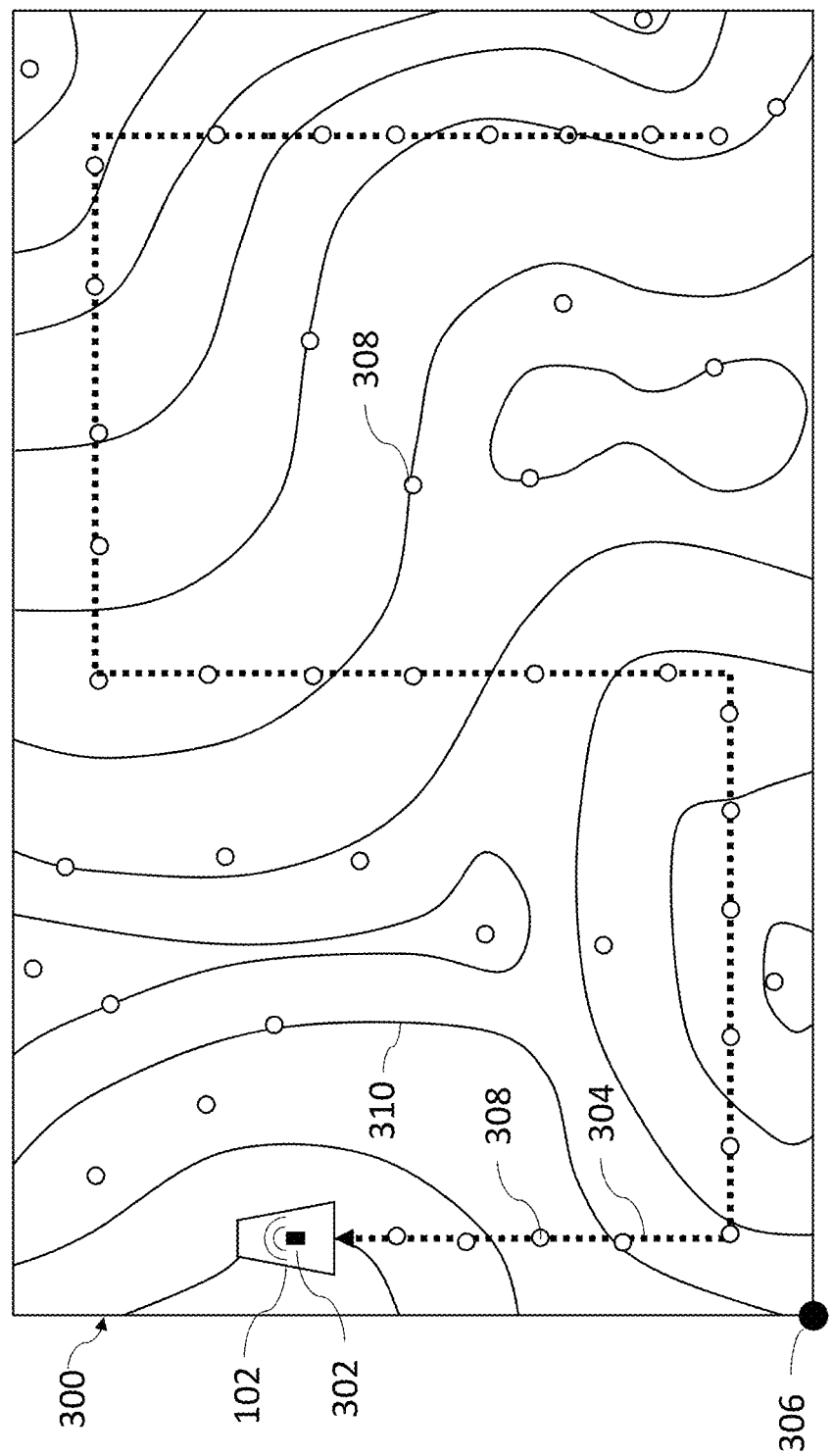

FIG. 3B illustrates a coverage map for the building 300, the coverage map being generated based on a plurality of network signatures produced by, at least in part, data from the sensor 302 of the robot 102 illustrated in FIG. 3A above, according to an exemplary embodiment. Sensor 302 may include a network analyzing sensor, such as an antenna/receiver, vector network analyzer ("VNA"), and/or other sensors configured to measure network parameters. In some instances, sensor 302 may be illustrative of portions of communications units 116 configured to measure or receive the network parameters. As illustrated, during operation of the robot 102 (i.e., navigation of route 304), a plurality of measurements 308 of network signatures may be collected at a plurality of different locations along the route 304. These network signatures may each comprise, at least in part, a measured signal strength value (e.g., in dBm, SNR, RSSI, etc.) measured using sensor 302 in addition to other measurable network parameters discussed above. The measurements 308 are localized within the building 300 based on a position of the robot 102 at a time of measuring the respective measurements 308, wherein the controller 118 may localize the robot 102 at all times during autonomous navigation/operation (e.g., using navigation units 106 and data from sensor units 114). The measurements 308 collected during navigation of route 304 and other measurements 308, spatially separated from route 304, collected during navigation of other routes (e.g., by other robots 102 and/or at prior times) may be utilized by a controller 118 of the robot 102, or a distributed network of processors of a server 202, to generate a map of network signatures as a function of space (i.e., a coverage map). The network signatures as a function of space has been illustrated by a contour map comprising isolines 310 of equal network signal strength separated by a constant value (e.g., 0.1 dB of RSSI). It is appreciated that using additional discrete measurements 308 to generate a coverage map (i.e., network signal strength as a function of space) within the environment 300 may further enhance accuracy of the determined coverage map. It is additionally appreciated that the coverage map illustrated comprises a map of a signal strength for a single network (e.g., a single local Wi-Fi network, 4G coverage, etc.) within the building 300, wherein the sensor 302 may collect measurements of a plurality of other networks not illustrated for clarity. Further, a coverage map may map other network parameters as a function of space for each network detected within the environment. The plurality of networks measured by the sensor 302 may be mapped in a substantially similar way and mapped simultaneously to the mapping of the illustrated network.

According to at least one non-limiting exemplary embodiment, an integration time may be imposed on the controller 118, or other processor (e.g., a server 202 illustrated in FIG. 2 above), during calculation of the coverage map of the building 300. The integration time may correspond to a set time period (e.g., 10 seconds, 1 minute, 1 hour, etc.) within which the controller 118 may consider all measurements 308 collected within the integration time for calculation of the coverage map. The integration time may limit a number of measurements 308 used to generate the coverage map temporally and may be based on, without limitation, navigation speed of the robot 102 and/or sampling rate of the sensor 302. Imposing an integration time may further improve temporal accuracy of the coverage map as the controller 118 is limited to measurements 308 captured within the integration time, thereby omitting points captured during times outside of the integration time. For example, coverage at night and during daytime within the building 300 may change drastically due to people entering the building 300 during the daytime and utilizing the network and leaving the building 300 at night. If no integration time is imposed, the controller 118 may utilize both measurements 308 measured at nighttime and measurements 308 measured during daytime which may yield a temporally inaccurate coverage map. By imposing an integration time, the controller 118, or other processor, may only consider measurements taken only within the integration time to enhance temporal accuracy of the determined coverage map (e.g., the controller 118 may only consider measurements 308 captured within an hour from a present time).

One skilled in the art may appreciate that for each integration time, a new coverage map of the building 300 may be generated. Sequential coverage maps (i.e., coverage maps generated during subsequent integration times) may be utilized to model temporal change of network coverage within the building 300. That is, sequential coverage maps may comprise a plurality of discrete samples of a signal strength function, as a function of space, within the building 300 to be utilized to model signal strength within the building 300 as an additional function of time. The aforementioned discretization of the signal strength function is based on the integration time. Accordingly, all measurements 308 illustrated in FIG. 3B may be captured within a single integration time by the robot 102 and/or by other robots 102 or edge devices 208 (not illustrated) within the building 300.

According to at least one non-limiting exemplary embodiment, a coverage map may be calculated continuously as more measurements 308 are obtained. A processor (e.g., processor 130 of a server 202) may calculate the coverage map using a weighted average of measurements 308, wherein newer measurements 308 are weighted more substantially or with greater importance during calculation of the coverage map than older measurements 308. That is, a coverage map may comprise a continuous time function of network coverage rather than a function discretized by an integration time discussed above.

According to at least one non-limiting exemplary embodiment, the robot 102 illustrated may have navigated a separate route (not illustrated) within the building 300 and collected network signature measurements 308 as the robot 102 navigated the separate route. The robot 102 may combine the data collected during navigation of both the route 306 and separate route to construct the coverage map illustrated (provided the measurements are captured within an integration time if an integration time is utilized).

According to at least one non-limiting exemplary embodiment, each measurement 308 taken by the sensor 302 may further comprise metadata comprising, at least, a time stamp. Time stamps from each measurement may be further utilized to model signal strength of a network as a function of time in addition to a function of space. In some embodiments, the metadata may further comprise location data for a respective measurement 308 for use in calculating a coverage map as a function of space within the building 300.

According to at least one non-limiting exemplary embodiment, measurements 308 of network signatures within the building 300 may be communicated to a server 202, illustrated in FIG. 2 above, by a robot 102 which collects the measurements 308. The server 202 and/or coupled devices 208 and 102 may execute computer-readable instructions determined, in part, by the server 202 to calculate the coverage map within the building 300 based on the measurements 308 and localization data of the measurements 308.

According to at least one non-limiting exemplary embodiment, a coverage map may comprise a mathematical function of signal strength and/or other network parameters as a function of space instead of a plurality of isolines 310 (i.e., instead of a contour map). The function may be N dimensional, N being an integer number proportional to a number of cellular bandwidths and Wi-Fi networks measured by the sensor 302 plus extra dimensions for space (i.e., two- or three-dimensional space) and time. That is, the illustration in FIG. 3B of isolines 310 is purely illustrative of a single network parameter (signal strength) plotted over an environment of the robot 102, wherein coverage maps may further include localized measurements of other network parameters.

According to at least one non-limiting exemplary embodiment, a coverage map may be plotted in global latitude and longitude coordinates. In some instances, network parameters may be utilized to estimate the latitude and longitude coordinates. Data from one or more sensor units 114, such as a magnetometer, may be utilized to convert a coverage map, or any computer-readable map, produced by the robot 102 from a local coordinate system of the robot 102 or environment to a location and orientation on Earth.

It is appreciated that the building 300 and coverage map calculated therein will be used as an exemplary building and coverage map for the figures described below, however, the broader systems and methods of the present disclosure may be applied to any building of any size, shape, and composition within which one or more robots 102, comprising a network analyzing sensor 302, operate. The broader systems and methods of this disclosure may further be applied to any temporally accurate (e.g., using an integration time of at most 12 hours) coverage map of an environment, however, coverage maps comprising sufficient temporal accuracy to localize a device using the systems and methods disclosed below may require robots 102 to collect network signature measurements 308 and generate the coverage map based on the measurements 308. Advantageously, use of robots 102 to collect measurements 308 may enable a mapping of coverage within a building 300 to be spatially accurate, as robots 102 may localize the measurements 308 accurately and consistently, as well as temporally accurately, as robots 102 may navigate routes within the building 300 and collect measurements 308 during autonomous operation, wherein the autonomous operation may occur multiple times a day and/or over long periods of time (e.g., hours) thereby yielding the temporal accuracy of the produced coverage maps.

Figure 4A:
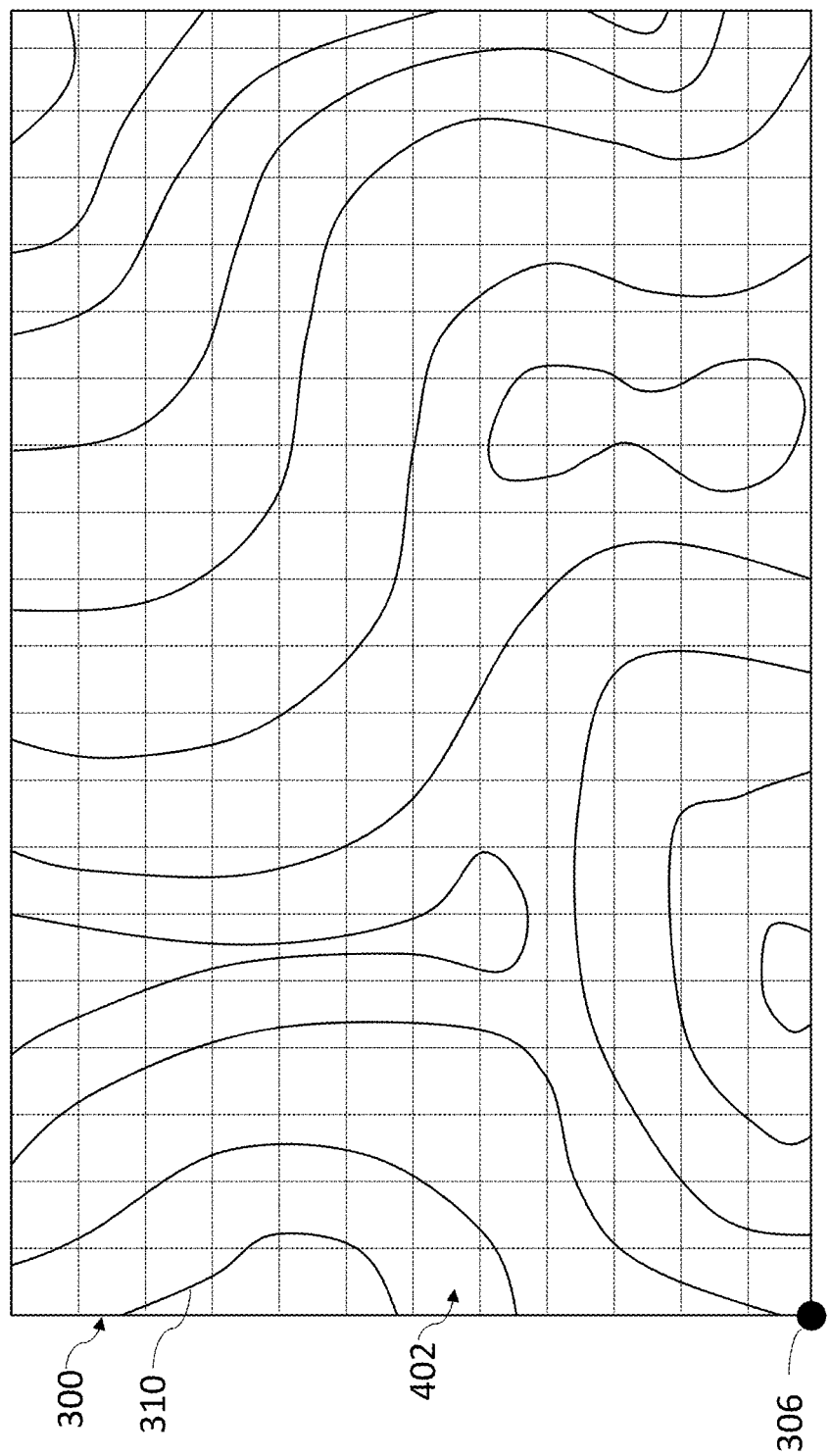
FIG. 4A illustrates a discretized coverage map, according to an exemplary embodiment.

FIG. 4A illustrates a coverage map of a building 300, the coverage map being generated based on a plurality of network signature measurements 308 captured by one or more robots 102 using a sensor 302 illustrated in FIGS. 3A-B above, according to an exemplary embodiment. The coverage map illustrated may comprise a computer-readable map of the building 300 stored on a non-transitory computer-readable memory of a server 202 or coupled devices thereof with a coverage function imposed thereon. The coverage function comprises measured network parameters of one or more cellular and/or Wi-Fi networks as a function of space within the building 300. It is appreciated that the coverage map illustrated only comprises isolines 310 for a signal strength (e.g., RSSI) of a single frequency band (i.e., a single network), wherein multiple networks may exist within the building 300 and may comprise different isolines 310 to the one illustrated. Stated differently, the coverage function may comprise at least an N dimensional function of N individual networks within the building 300, N being an integer value greater than zero. For example, the coverage function may comprise two or three dimensions for space (e.g., (x, y) as illustrated on the two dimensional map), one dimension for time, and N×M additional dimensions corresponding to M network parameters measured for N Wi-Fi and/or cellular networks within the building 300, N and M being an integer number.

A processor 130 of the server 202, or distributed network of processors coupled to the server 202, may be configured to execute computer-readable instructions to discretize the coverage map into a plurality of regions 402, each region comprising a predetermined height and width (e.g., 1 foot by 1 foot squares, 1 cm by 1 cm squares, etc.) or area. In some instances, these regions 402 may represent pixels on a computer-readable map. The size of the regions 402 (i.e., resolution) may be chosen based on processing power of processor 130 and processing power of all processors coupled to the server 202 (e.g., processing power of controllers 118 of networks 210 and/or devices 208). Each region 402 may comprise a unique network signature, as illustrated next in FIG. 4B.

Figure 4B:
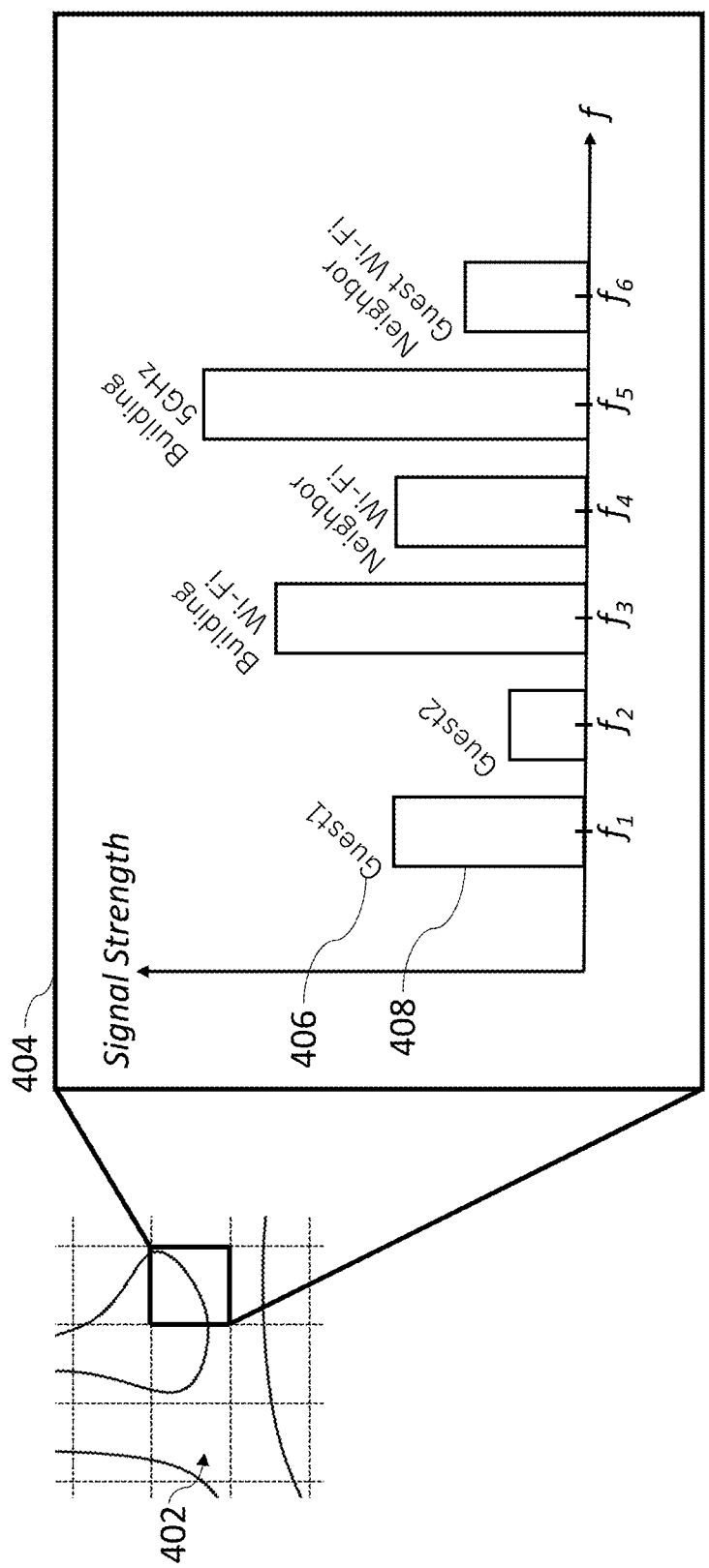
FIG. 4B illustrates a network signature for a discretized region within a discretized coverage map, according to an exemplary embodiment.

FIG. 4B illustrates a network signature 404 for a single region 402 of a discretized coverage map, according to an exemplary embodiment. As discussed previously above, a network signature as used herein may include various parameters, also referred to herein as "network parameters," associated with one or more networks, network signals, and/or network interfaces. The network parameters may include, but are not limited to, frequency, reference signal strength, access point names ("APN") and bearer information (for use in, inter alia, LTE, eHRPD, or EvDO networks), public land mobile network ("PLMN," including GSM/2G, UMTS/3G, LTE/4G, offered by a single operator within a given country, often referred to as a "cellular network"), area codes, global cell ID, active SIM carrier names, network types (e.g., 2G, 3G, 4G, 5G, LTE, etc.), device models, platform types, signal strengths (RSRP, RSRQ, SNR, RSSI, etc.), download/upload throughput, download/upload latency, download/upload jitter, Wi-Fi SSID (i.e., a network name), international mobile equipment identity ("IMEI"), international mobile subscriber identity ("IMSI"), layer 3 ("L3") messages in GSM, non-access stratum ("NAS") messages (e.g., in universal mobile telecommunications services ("UMTS") and LTE telecommunications protocols) including QoS parameters, signaling messages, radio-resource control ("RRC") messages (including master information block ("MIB") and system information block ("SIB"), broadcast by eNodeB/HeNB), channel configuration messages, packet service data, transmission control protocol/internet protocol ("TCP/IP"), user datagram protocol ("UDP"), session initiation protocol ("SIP"), CDMA layer 1 messages (e.g., including SID, NID, BID, band class, channel, Rx power, Tx power, dominant, active and neighbor set PN and Eclo), LTE layer 1 messages (e.g., including RSRP, RS SNR, RSRQ, PCI, ECI, downlink EARFCN, uplink EARFCN, band, bandwidth, MCC/MNC, modulation schemes, MCS intex, TxMode, CQI, RSSI, and TxPower), WCDMA layer 1 messages (e.g., including RSSI, RSCP, Eclo, Active set and neighbor set measurements, Cell ID (node, RNC), LAC, RAC, UETxPower, UL interface, MCC/MNC, and downlink/uplink UARFCN), general layer 1 messages (e.g. including physical layer throughput, BLER, 5G voice codec type (e.g., AMR NB/WB), LTE voice codec type, WCDMA voice codec type, CDMA voice codec type, GSM voice codec type, LTE random access configuration and execution messages, intra/inter/IRAT handover configuration parameters and execution measurements, IRAT, cells, frequency, delays, and failures), other layer 1 messages (e.g., including carrier aggregation parameters, RF metrics for Pcell and Scell, activation/deactivation messages, throughput, HSDPA/HUSPA configuration parameters, activation/deactivation messages, EVDO configuration parameters (e.g., DRC intext, ASP PN), Rx/Tx power, Eclo, SINR, number of users, and TCH throughput), and/or similar parameters of a network or network interface (defined below). Although the following disclosure focuses on a subset of these parameters for clarity (namely signal strength), one skilled in the art may appreciate that any of these parameters may be utilized in defining a network signature, as discussed further below. These network parameters may be localized to a position based on a position of a robot 102 when the robot 102 measures these network parameters.

The network signature 404 may comprise at least a measure of signal strength of one or more networks corresponding to a region 402. Each network 408 within the network signature 404 may comprise an amplitude, measured in dBm, SNR over a sensor 302, as a RSSI, etc., and a network ID 406 (i.e., SSID), comprising a string of characters (e.g., "Guest1," "Neighbor's Wi-Fi," "Building 300 Wi-Fi," 5 GHz variants thereof, etc.) and/or numeric value(s). If multiple measurements 308 are measured within a single region 402, amplitudes/RSSI/SNR for these networks collected by a sensor 302 may be averaged to produce a network signature 404 for the region 402. If no measurements 308 exist within a region 402, measurements 308 nearby regions 402 (e.g., captured in adjacent regions 402) may be utilized to infer (i.e., estimate) a network signature for the region 402 (e.g., using linear or nonlinear approximations).

It is appreciated by a skilled artisan that each region 402 within the building 300 may comprise a unique network signature 404 provided a sufficient number of network parameters are measured and/or sufficient number of networks exist within the building 300, wherein adjacent regions 402 may comprise substantially similar, but not exactly equal network signatures 404, due to network signal strength of the various networks changing as a function of space. For example, a building 300 comprising only a single Wi-Fi network may comprise some regions 402 with a same network signature (i.e., regions 402 comprising equal network signal strength of the single Wi-Fi network); however, measuring network signal strength for a plurality of networks 408 within the building 300 may further enhance uniqueness of each network signature 404 for each respective region 402. It is appreciated that a network signatures 404 may further comprise measurements of network parameters for 3G, 4G, or 5G cellular networks and variants thereof (e.g., LTE), wherein network signatures 404 are not intended to be limited to Wi-Fi networks.

It is appreciated by one skilled in the art that network signatures 404 for a given region 402 may change over time. Accordingly, use of one or more robots 102 comprising a sensor 302 may provide temporally accurate coverage data (e.g., temporally accurate measurements 308) as the robots 102 act as mobile autonomous measurement units capturing measurements 308 as they operate such that a discretized coverage map comprises regions 402 with temporally accurate network signatures 404 associated thereto that may be generated and utilized for localizing devices using methods discussed below.

Figure 10:
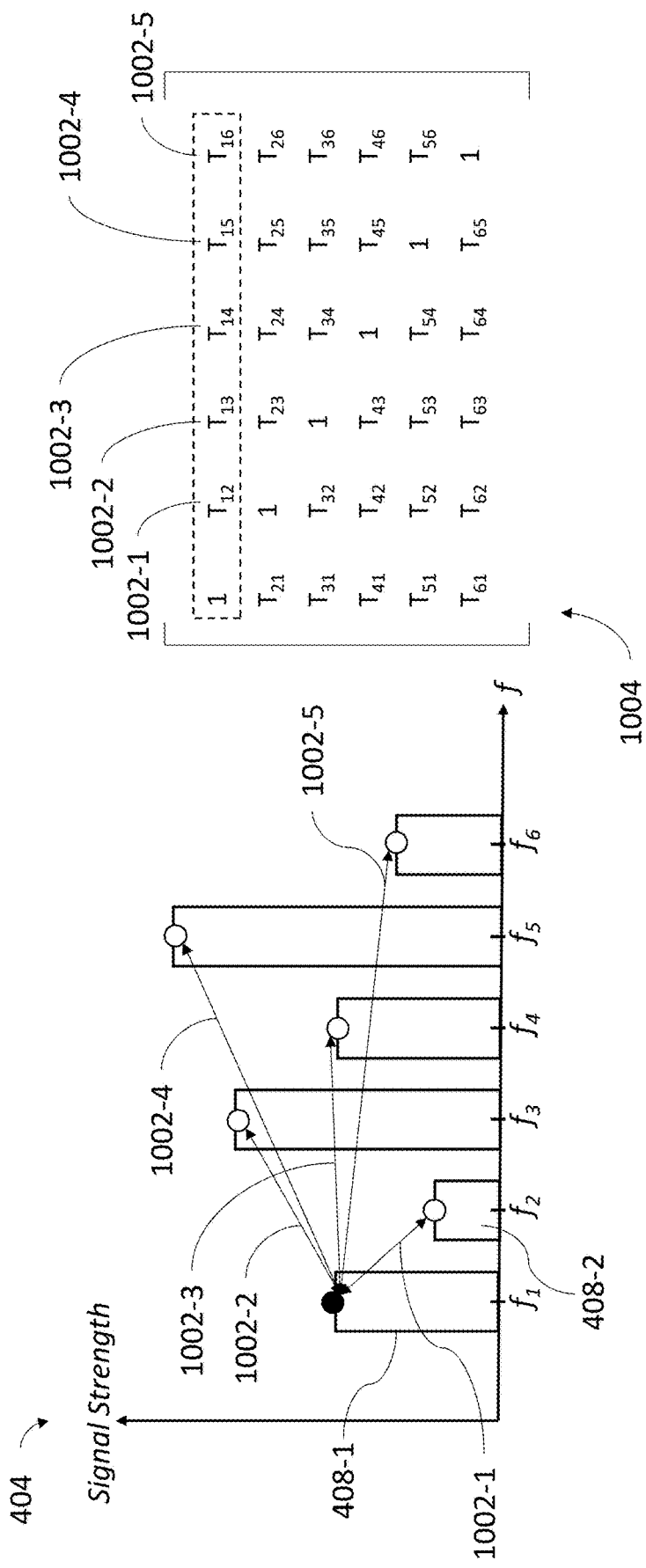
FIG. 10 illustrates a method for representing a network signal strength measure as a tensor of relative amplitudes, according to an exemplary embodiment.

According to at least one non-limiting exemplary embodiment, a network signature 404 may further comprise a measure of relative amplitudes of all networks 408 for a region 402. The relative amplitude parameter may be recorded as a pose graph, matrix, array, tensor, or other value, as illustrated in FIG. 10 below.

Figure 5:
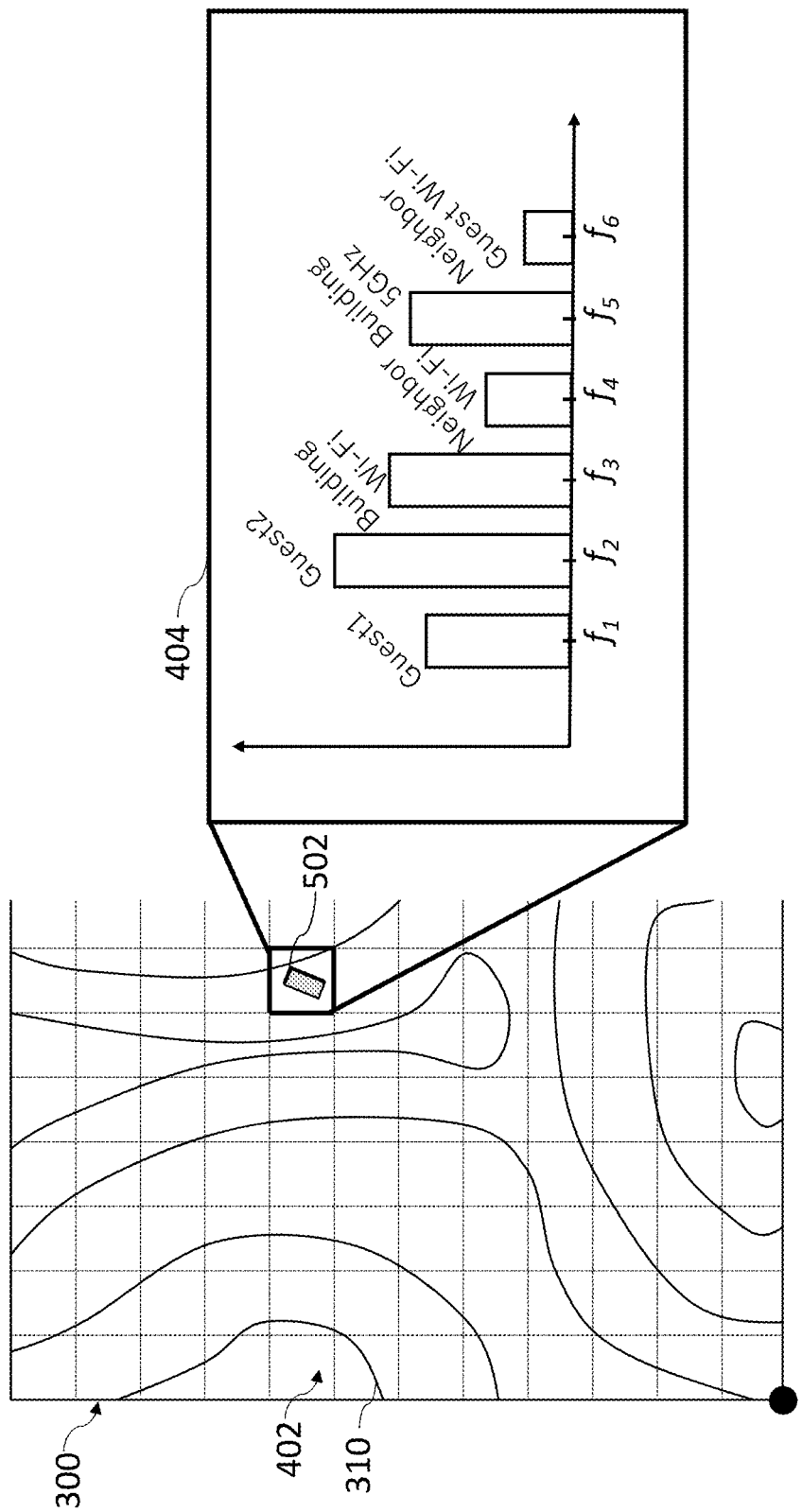
FIG. 5 illustrates a device being localized within a coverage map, and thereby within an environment, based on a received network signature, according to an exemplary embodiment.

FIG. 5 illustrates a device 502 being localized within a building 300, the building 300 comprising a coverage map determined therein based on measurements 308 collected by one or more robots 102, according to an exemplary embodiment. The device 502 may comprise, without limitation, a cell phone, a robot 102, an IoT device, or any other device capable of measuring a network signature 404 and communicating the network signature 404 to a server 202. The device 502 may output a network signature 404 to the server 202, the network signature comprising a measure of network parameters for a plurality of network bandwidths (e.g., local Wi-Fi networks and cellular 3G, 4G, and 5G networks). The network signature 404 may comprise, among other measured parameters, a measure of relative amplitudes of each network bandwidth with respect to each other and/or a measure of amplitude of each bandwidth (e.g., dBm, SNR, RSSI, RCPI, etc.) stored as a matrix, array, or other data structure/format. The network signature 404 from the device 502 may be measured and communicated by, for example, an application running on the device (i.e., computer-readable instructions being executed by a processing device 138 on the device 502), wherein the device 502 may further comprise a transmitter configured to wirelessly communicate the network signature 404 to the server 202.

The server 202 may localize the device 502 to a region 402 illustrated, based on the network signature 404 from the device 310 matching a network signature 404 of the illustrated region 402 of the coverage map. The server 202 may execute specialized sorting, matching, and/or clustering algorithms to determine the network signature 404 of the region 402 within the coverage map which matches, within a threshold deviation or range, to the received network signature 404 from the device 502. For example, the server 202 may store a coverage map in memory 132 as a tensor, the tensor comprising a plurality of network signatures 404 therein corresponding to respective regions 402 of the coverage map. Each of the respective network signatures 404 may comprise at least one of a measure of amplitudes of each network 408 (e.g., stored as an array or set of values) and/or a measure or relative amplitudes of each network 408 of the network signature 404 with respect to each other (e.g., as illustrated in FIG. 10). The server 202 may parse the tensor using a clustering analysis to determine at least one network signature 404 therein which matches the received network signature 404 from the device 502, within the threshold deviation or range (e.g., ±1 dBm). The server 202 may then determine an optimal or best network signature 404 of the at least one determined network signatures 404 which most closely matches the received network signature 404 from the device 502. Additionally, the server 202 may verify that other network parameters (e.g., SSID, messages, etc.) of the received network signature 404 from the device 502 correlates with one or more network signatures 404 of the coverage map.

Other methods for determining at least one network signature 404 similar to a received network signature 404 from the device 502 are considered without limitation as the server 202 may comprise a plurality of distributed processors on which complex and computationally taxing algorithms may be executed quickly. As a second example, a neural network may be trained to receive an input coverage map of the building 300, receive the network signature 404 from the device 502, and determine at least one region 402 which comprises an optimal or best matching network signature 404 to the network signature 404 of the device 502. It is appreciated that localization accuracy depends on a size of regions 402, wherein smaller regions 402 may yield an improved localization accuracy at a cost of increased computing resources associated with the matching of the received network signature 404 to a region 402 of the coverage map. The size of regions 402 may also be proportional to area covered by measurements 308 of network signal strength and/or a density of measurements 308 within building 300 (i.e., a number of measurements 308 per unit area).

Figure 6:
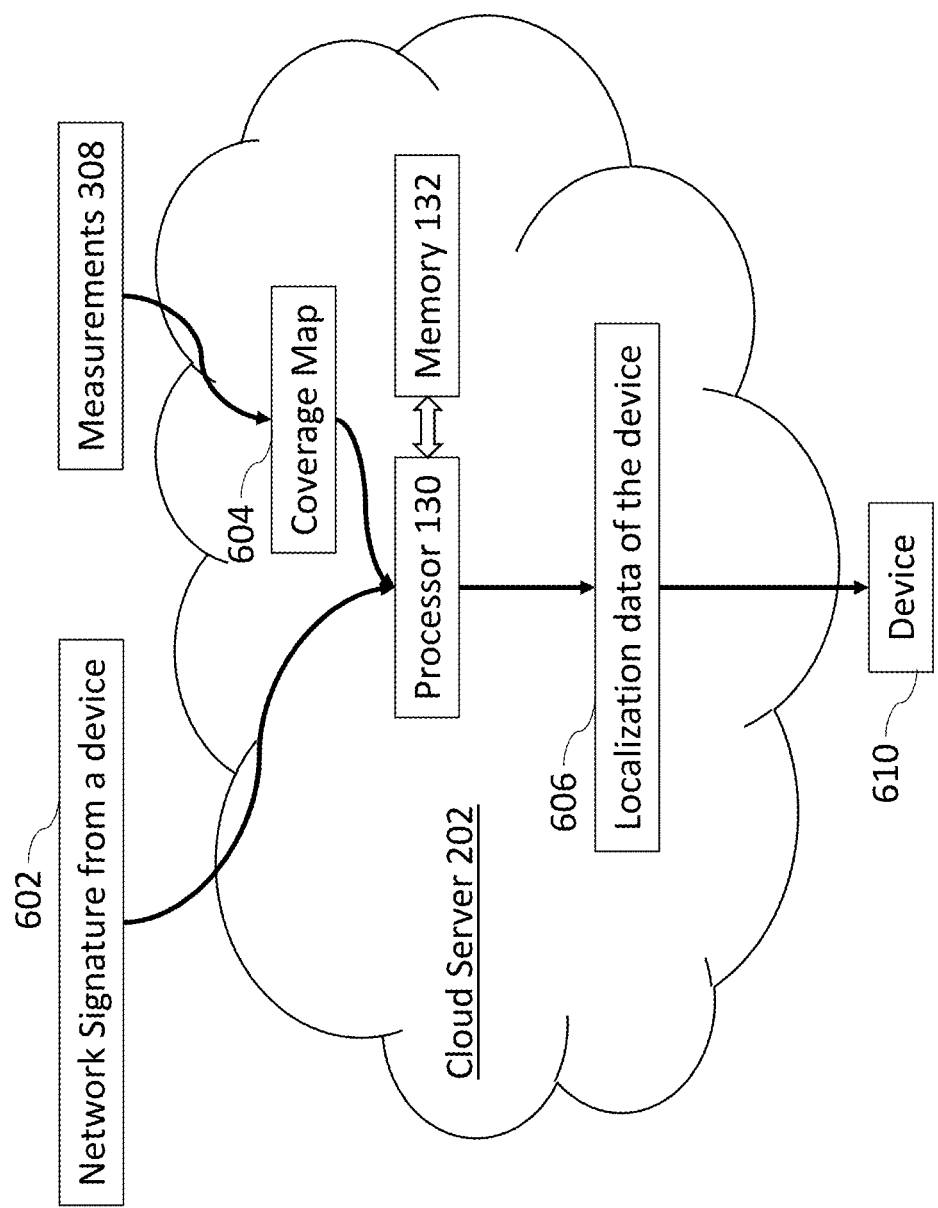
FIG. 6 is a functional block diagram illustrating a workflow for a cloud server to localize a device based on a network signature from the device, according to an exemplary embodiment.

FIG. 6 illustrates a server 202 receiving a network signature 602 from a device (e.g., device 502) within an environment comprising a coverage map therein, according to an exemplary embodiment. The network signature 602 from the device may comprise all, none, different, or additional networks 408 with respective network IDs 406 as illustrated by network signature 404 of FIG. 4 above. The server 202 may determine the environment in which the device is located based on recognizing network IDs 406 and/or various network messages and parameters associated within the network signature 602 (e.g., by recognizing "Building 300 Wi-Fi" and other networks, the server 202 may determine the device is within building 300). For example, server 202 may utilize GPS data from the device 502 to determine that the device 502 is within an environment comprising a coverage map produced by one or more robots 102.

Accordingly, the server 202 may receive a coverage map 604 of the environment from one or more robots 102 or may retrieve the coverage map 604 from memory 132, provided the retrieved coverage map 604 is temporally accurate (e.g., the retrieved coverage map 604 comprises coverage data measured within an integration time from a present time). The coverage map 604 is generated by either the server 202 or one or more robots 102 based on measurements 308 of network signatures collected by the one or more robots 102 within the environment in which the device 502 is located. The processor 130 may execute a method 700, illustrated in FIG. 7 below, to determine localization data 606 of the device within the coverage map 604 based on the received network signature 602 from the device. Localizing the device within the coverage map 604 may comprise localizing the device within a region 402 of a discretized coverage map 604, as illustrated in FIG. 4-5 above. Localization data 606 of the device may be stored in memory 132 or communicated to a device 610. The device 610 may comprise the same device 502 from which the network signature 602 was received or one or more separate devices (e.g., a robot 102, a separate server, an external data source 206, etc.).

According to at least one non-limiting exemplary embodiment, the processor 130 of the server 202, and/or any processors of coupled devices 208 and 210 thereof, may execute additional computer-readable instructions to utilize the localization data 606 to generate a signal to the device 610. The signal may comprise an insight based on processing the localization data (e.g., proximity to one or more notable features within the environment of the coverage map 604, wherein the signal may comprise an advertisement for the one or more notable features). For example, the signal may comprise targeted advertisements based on the proximity of the device 502 to one or more products. In some instances, the signal may provide the user of the device 502 with directions to a desired location based on the current location of the device 502.

According to at least one non-limiting exemplary embodiment, an application programming interface (API) 1102 may be utilized to interface between the device which communicates network signature 602 and the server 202, as further illustrated in FIG. 11 below. The API 1102 may be further configured to interface between the server 202 and device(s). Interfacing between the server 202 and devices comprises the API 1102 receiving the network signature from the device, determining if the server 202 should process the network signature (i.e., localize the device based on the network signature), and the API 1102 outputting the localization data to the device(s). That is, API 1102 provides an interface for the server 202 such that queries 1104 may be inputted to the cloud server from a device or external entity 1110 (e.g., an application on the device, a company, a separate cloud server, etc.). Providing an interface may enhance data security of data stored on the server 202 (e.g., coverage maps generated by robots 102) as discussed in greater detail below in FIG. 11.

It is appreciated that processor 130 of the server 202 may be illustrative of a distributed network of processors and controllers of devices 208 and robots 102 of robot networks 210 coupled to the server 202. Similarly, memory 132 as illustrated may comprise one or more computer-readable memory or storage units of the server 202, external data sources 206, devices 208, and/or robots 102. Accordingly, any computation performed by the processor 130 may be illustrative of a distributed network of processors and controllers 118 of devices 208 and robots 102 coupled to the server 202.

Figure 7:
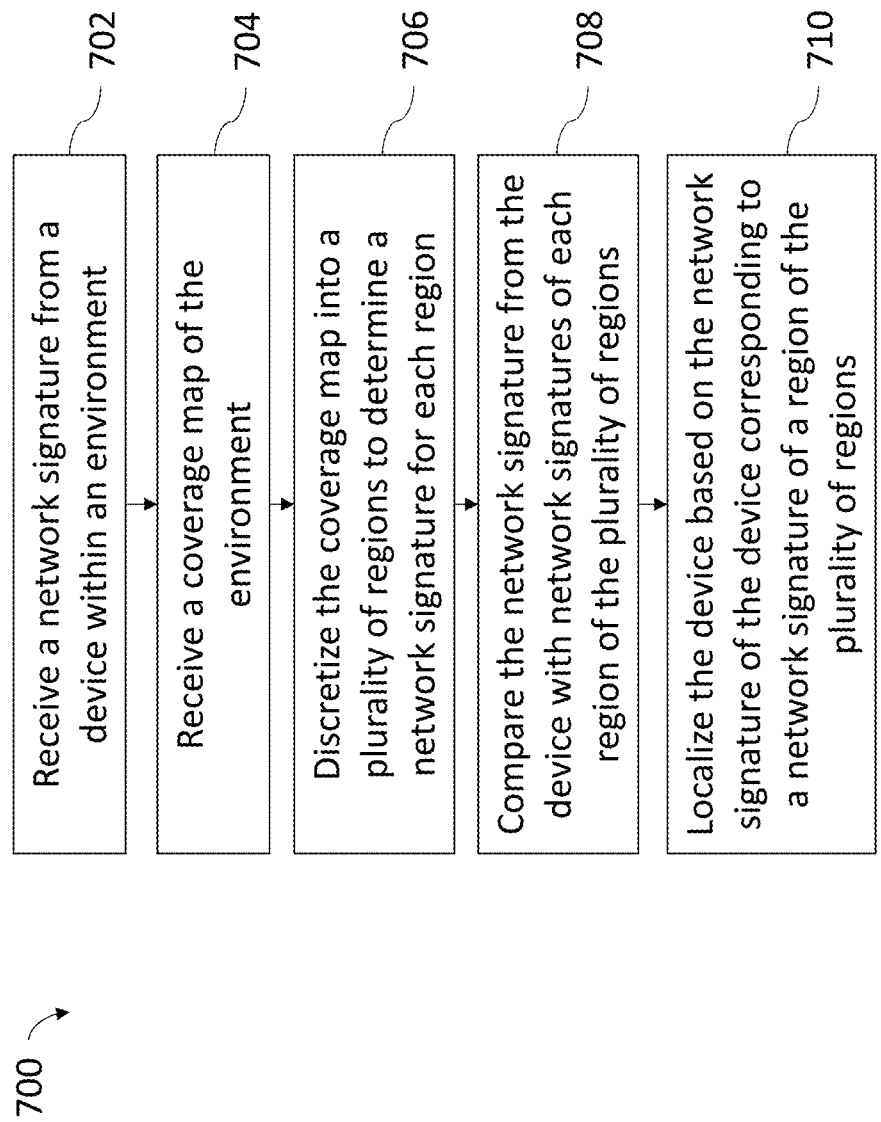
FIG. 7 is a process flow diagram illustrating a method for a cloud server to localize a device based on a network signature from the device, according to an exemplary embodiment.

FIG. 7 is a process flow diagram illustrating a method 700 for a server 202 to localize a device based on a received network signature 602 from the device, according to an exemplary embodiment. Method 700 may be executed by one or more processors 130 of the server 202 and/or one or more processors on a distributed network of devices 208 and robots 102 executing computer-readable instructions from one or more memories.

Block 702 illustrates the server 202 receiving a network signature 602 from a device within an environment (e.g., building 300). The network signature 602 may be communicated to the server 202 from the device via wireless and/or wired communications. For example, an application running on the device may communicate to a network (e.g., a Wi-Fi network coupled to the server 202) within the environment a network signature 602, the network being coupled to the server 202. The device may comprise, without limitation, a cellular phone, a robot 102, an IoT device, or any other device with a transmitter capable of measuring a network signature at a location of the device and communicating the network signature to the server 202.

Block 704 illustrates the server 202 receiving a coverage map 604 of the environment of the device. The coverage map 604 may be generated using a plurality of measurements 308, or sampled network signatures, collected by network-analyzing sensors 302 of one or more robots 102, as illustrated above in FIGS. 2A-B. The coverage map 604 may be stored in a memory 132 of the server 202 and/or memories of coupled devices thereto.

According to at least one non-limiting exemplary embodiment, the coverage map 604 comprises a coverage map of the environment generated during a previous integration time. For example, an integration time of coverage maps may comprise one hour. If the network signature 602 from the device is received at 2:05 pm, the coverage map 604 may comprise a coverage map of the environment generated using measurements 308 captured between 1:00 pm and 2:00 pm. Alternatively, the server 202 may utilize measurements 308 captured between 1:05 pm up to the current time 2:05 pm, however a new coverage map or additional calculations using the measurements 308 captured within this window may need to be generated.

According to at least one non-limiting exemplary embodiment, coverage maps stored in memory of the server 202 may be continuously updated upon one or more robots 102 collecting and transmitting to the server 202 measurements 308 during operation. For example, server 202 may update the network signature 404 associated with each region 402 of the coverage map upon receipt of one or more measurements 308 within the region 402. Server 202 may be coupled to a plurality of robots 102 and/or robot networks 210 operating within separate environments, each environment comprising a coverage map, wherein server 202 may continuously update each coverage map of each environment upon the robots 102 collecting new measurements 308.

Block 706 illustrates the server 202 discretizing the coverage map into a plurality of regions 402, each respective region 402 comprising a respective network signature 404 associated thereto. The network signature 404 for each region 402 may be based on a measurement 308 within the region 402. If multiple measurements 308 exist within a region 402, amplitudes of networks 408 within the measurements 308 may be averaged together. If no measurements 308 exist within a region 402, a network signature 404 may be estimated for the region 402 based on nearby measurements 308 of nearby regions 402 (e.g., using a linear or nonlinear approximation). In some embodiments, coverage maps may comprise a computer-readable map comprising a plurality of pixels, each pixel being encoded with a network signature based on one or more measurements 308 from a robot 102 and each pixel representing a region 402, wherein the coverage map is already discretized.

Block 708 illustrates the server 202 comparing the network signature 602 from the device with network signatures 404 of each region 402 of the plurality of regions of the coverage map. The comparison may comprise the server 202 determining at least one network signature 404 of at least one corresponding region 402 which is substantially similar to the received network signature 602 from the device. The server 202 may perform, for example, a clustering analysis of all network signatures 404 within the discretized coverage map to determine one or more network signatures 404 similar to the received network signature 602 from the device to narrow the search for a network signature 404, which matches network signature 602 from the device. A threshold variance may be imposed on the comparison such that a network signature 404 of a region 402 may be considered substantially similar to the received network signature 602 if amplitudes of networks therein are within the threshold variance (e.g., ±2 dBm, within 5% error, etc.). A network signature 404 may further comprise a measure of relative amplitudes of each network 408, wherein the comparison may comprise comparing the relative amplitudes of the received network signature 602 with relative amplitudes of each network signature 404 of each respective region 402 within the threshold variance, as illustrated in FIG. 10 below. Some network parameters may be required to be met without any tolerance in order to correlate the received network signature 602 with a network signature of a region 402, such as SSIDs of the networks as appreciated by one skilled in the art. Stated differently, some network parameters of the network signature received from the device must match exactly with the network parameters of the coverage maps (e.g., the names, or SSIDs, of the networks must be identical) while some parameters may include tolerance (e.g., SNR may deviate by 1 dB between the received signature and a signature of the coverage map).

Block 710 illustrates the server 202 localizing the device based on the network signature 602 from the device corresponding to a network signature 404 of a region 402 of the discretized coverage map. The comparison in block 708 may yield one or more regions 402 comprising a network signature 404 substantially similar to the received network signature 602 from the device, wherein the server 202 may select a region 402 comprising a network signature 404 which most closely matches, among other measured network parameters, amplitudes and relative amplitudes of networks within the received network signature 602. The selected region 402 may therefore correspond to a region within which the device is localized.

Localization of the device using a coverage map may comprise an accuracy proportional to a size of regions 402 (i.e., a resolution of the discretized coverage map). The accuracy may be further proportional to a temporal accuracy of the coverage map, which is in turn based on a number of measurements 308 used to generate the coverage map. Advantageously, use of a plurality of robots 102 coupled to a server 202 may ensure the availability of temporally accurate coverage maps as the robots 102 may collect measurements 308 during normal operation (e.g., while performing other tasks). Normal operations of the robots 102 may comprise navigating a same route or set of routes daily or multiple times a day, thereby consistently and autonomously acquiring measurements 308. Additionally, use of a distributed network of processors as illustrated in FIG. 2 may enable the regions 402 to be sufficiently small (e.g., on the order of inches) as the server 202 may perform the method 700 using the distributed system of processors.

According to at least one non-limiting exemplary embodiment, a server 202, upon localizing a device 502 using method 700, may emit a signal to the device 502 based on (i) a location of the device within the environment, or (ii) a trajectory of the device within the environment, the trajectory being measured using a plurality of locations of the device 502 measured over time as illustrated next in FIG. 8. The emitted signal may comprise, for example, a notification, the localization data (e.g., in local Cartesian coordinates with reference to an origin 306, in latitude and longitude coordinates, etc.), or a sequence of computer-readable instructions to be executed by a processor of the device 502. For example, a device 502 may comprise a cell phone and be localized near a shelf in a store, the shelf may comprise an out-of-stock item, wherein the emitted signal may comprise a notification to the cell phone corresponding to an online distributer of the out-of-stock item for an owner of the cell phone to consider. As another example, the localization data itself may be utilized by the device 502 if the device 502 is, for example, a robot 102 navigating within the environment. As a final example, the device 502 may receive a sequence of computer instructions to be executed on a processor of the device to configure the device 502 to perform a function based on its localized position (e.g., emit a noise, trigger an alarm, run an application, etc.).

Figure 8:
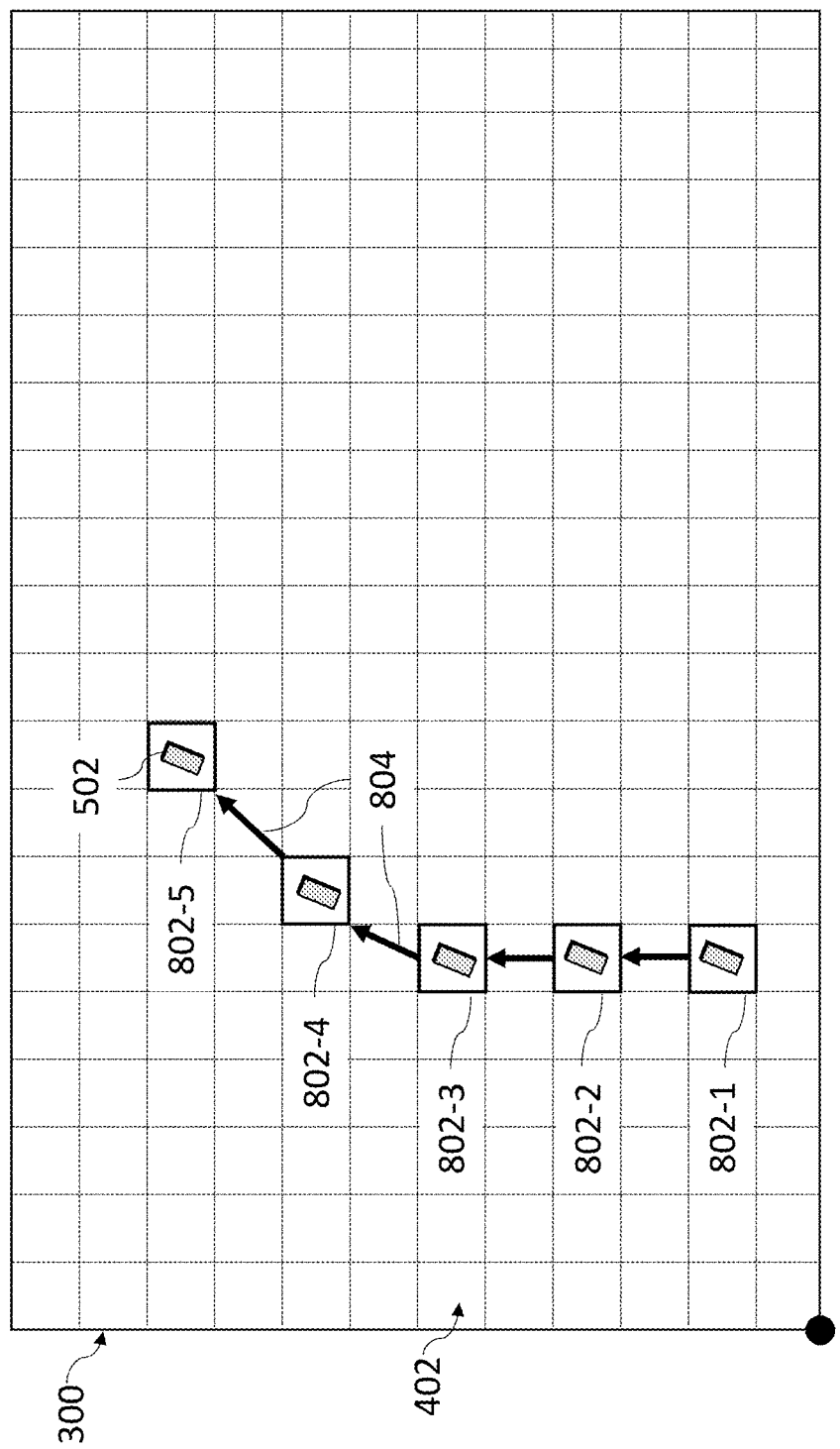
FIG. 8 illustrates a method for determining a trajectory of a device within an environment, according to an exemplary embodiment.

FIG. 8 illustrates a method for measuring a trajectory 804 of a device 502 within a building 300, the building 300 comprising a discretized coverage map (contour lines omitted for clarity) therein generated based on measurements 308 from one or more robots 102, according to an exemplary embodiment. Device 502 may include, without limitation, a cell phone, IoT device, tablet, smart-watch, and/or devices 208 shown in FIG. 2. The device 502 may be localized within the environment at locations 802 (802-1 to 802-5) at respective time steps $t_i$, index i being an integer value equal to and greater than zero. Each time step between times $t_i$ and time $t_{i+1}$ may correspond to, without limitation, a rate at which network signatures 404 from the device 502 are received by the server 202 or processing capabilities of the server 202 (i.e., speed at which the device 502 may be localized using method 700 above). The device 502 may comprise an associated device ID (e.g., an ESN, GSM ID, etc.) such that the server 202 may recognize the device 502 and track its trajectory. Utilizing the methods disclosed above in FIG. 4-7, the device 502 may be localized at a plurality of regions 402 at a plurality of respective times, thereby providing server 202 with a trajectory 804 of the device measured over time. This trajectory 804 may be stored in a memory of the server 202, or coupled components thereof, for use in predicting behaviors of devices within the building 300, as illustrated next in FIG. 9A, and among other benefits apparent to one skilled in the art.

Figure 9A:
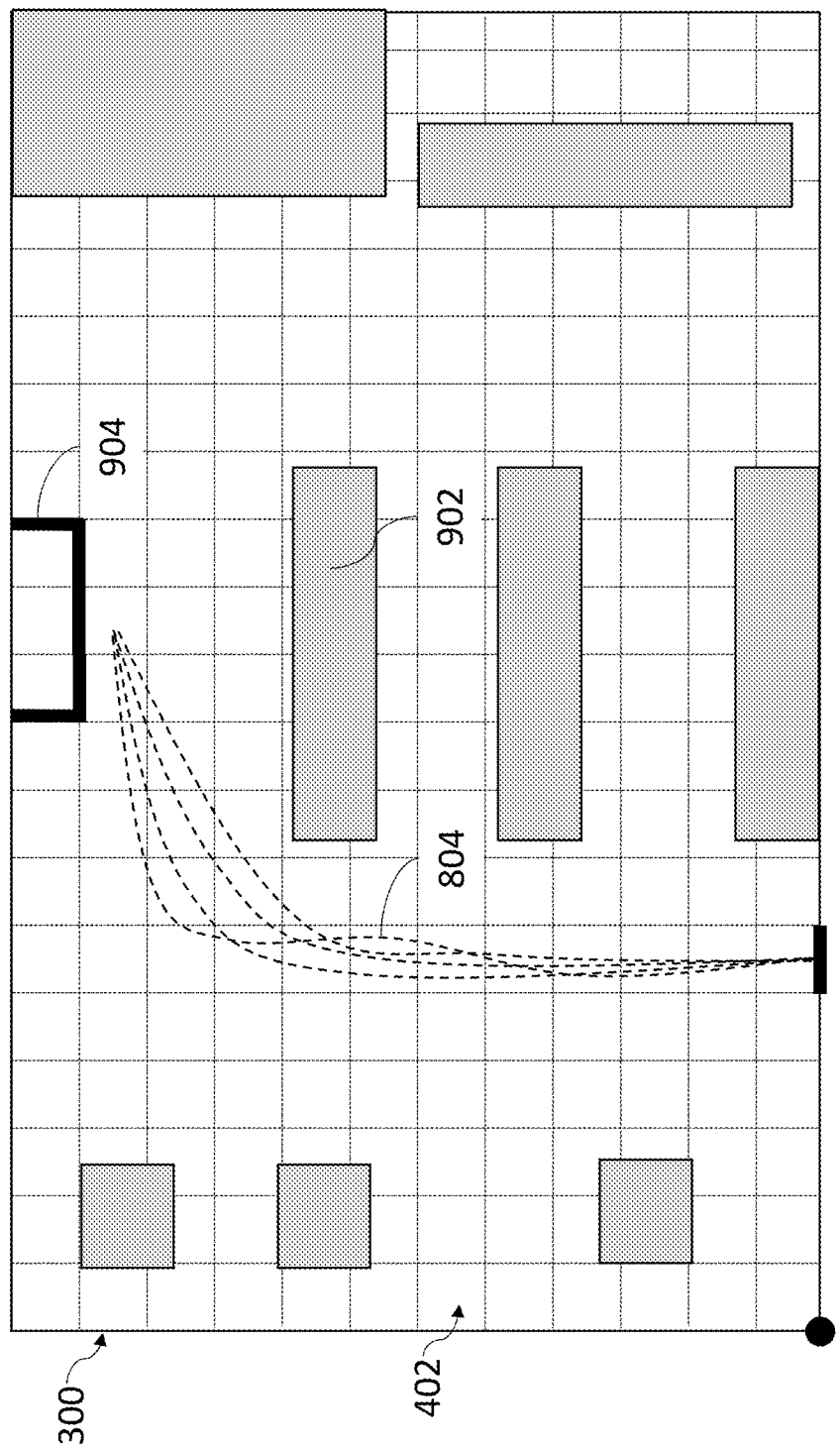
FIGS. 9A-B illustrate a cloud server predicting a trajectory of a device within an environment based on previously measured trajectories, according to an exemplary embodiment.

FIG. 9A illustrates a building 300 comprising a plurality of objects 902 and a measured coverage map therein (omitted for clarity), the coverage map calculated using measurements 308 collected by one or more robots 102 as illustrated in FIGS. 3A-B above, according to an exemplary embodiment. By way of illustrative example, building 300 may comprise a store, wherein objects 902 may comprise shelves within the store. Using the method 700 of FIG. 7 above to localize a device within the building 300 and the method illustrated in FIG. 8 to measure a trajectory of the device (i.e., repeating portions of method 700 over time), a plurality of trajectories 804 for a plurality of devices may be determined. Each trajectory 804 may be measured contemporaneously or at separate times (e.g., over a period of two weeks or more) corresponding to a trajectory of a respective device localized within building 300. Each trajectory 804 may represent the trajectories of a single device 502 over time or a plurality of different devices 502. The building 300 may comprise a feature 904 such as, without limitation, a popular display/feature within the store. The server 202 may utilize the plurality of trajectories 804 to determine the popularity of the feature 904 (e.g., by observing a substantial number of trajectories 804 leading to the feature 904). It is appreciated that a plurality of other trajectories 804 leading to other regions 402 within the building 300 may also be mapped but have been omitted for clarity from the illustration.

Figure 9B:
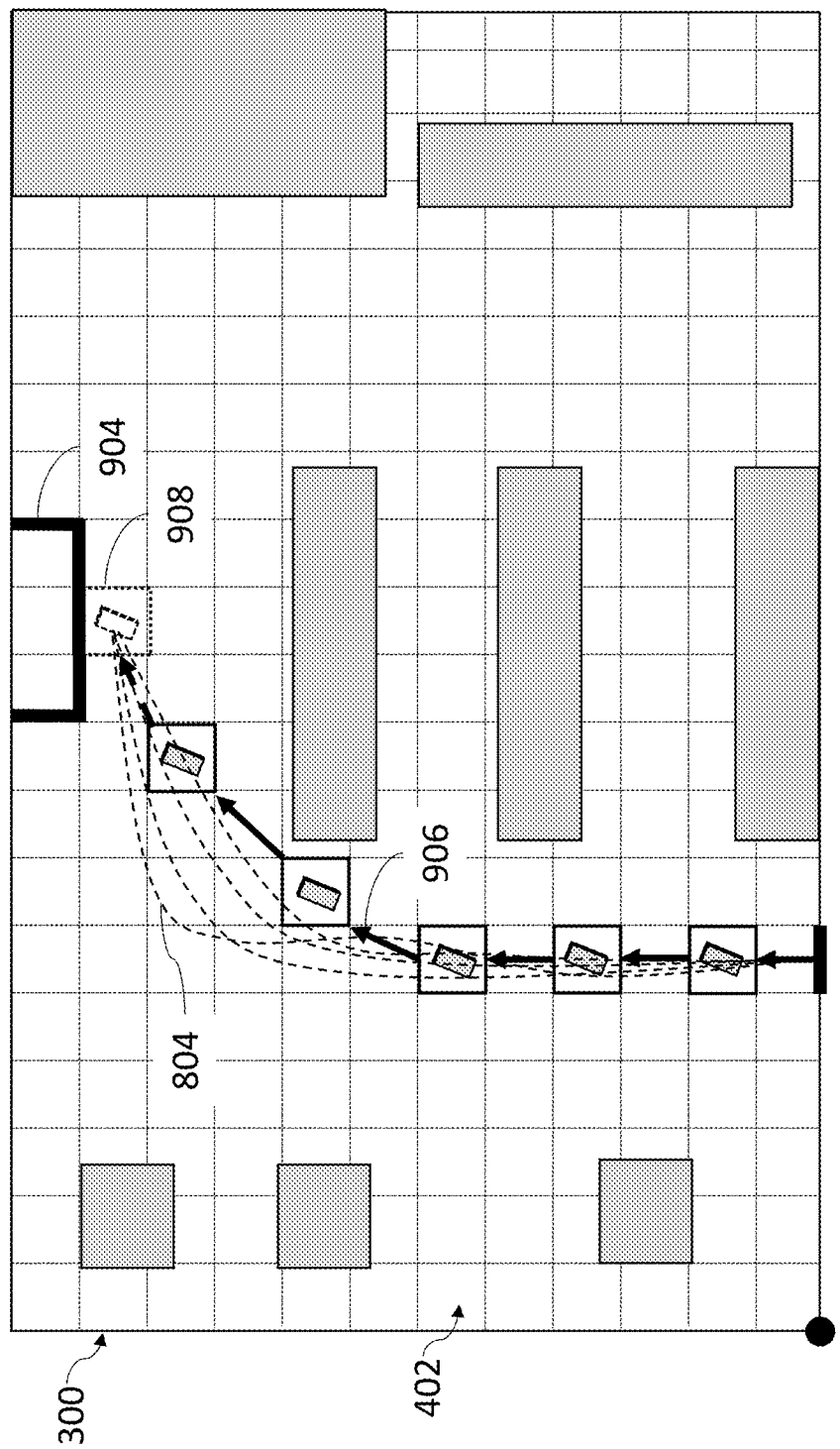

FIG. 9B illustrates a device 502 being localized within the building 300, according to an exemplary embodiment. The trajectory 906 of the device 502 may be measured using the methods illustrated in FIGS. 7-8 above. Based on a server 202 recognizing a trend of trajectories 804 of other devices within the store 300 and based on a current trajectory 906 of the device 502, the server 202 may infer the device 502 to follow the trend of prior trajectories 804 and predict the device 502 to be at a location 908 near feature 904 at a future time. Accordingly, the server 202 may emit a signal to the device 502 based on its proximity to the feature 904. For example, feature 904 may comprise a restaurant within a shopping mall and device 502 may be a cell phone, wherein the emitted signal may comprise a notification to the cell phone comprising discounts, promotions, sales, advertisements, coupons, etc. for the restaurant.

According to at least one non-limiting exemplary embodiment, tracking of a plurality of trajectories 804 of a plurality of devices 502 may be utilized by an owner of building 300 for optimizing a layout of the building 300. For example, building 300 may comprise a store, wherein a plurality of trajectories 804 may be determined and utilized to optimize a layout of the store to avoid congestion in certain aisles, optimize locations of shelf displays, and/or enhance shopper experience based on trends of trajectories 804 of the shoppers, wherein the shoppers may comprise cell phones or other devices 502 which communicate to the server 202 (e.g., using an application which localizes items within the store). One skilled in the art may appreciate that identifying popular features 904 may also be of use in other environments, such as warehouses (e.g., to optimize the layout such that popular items are readily available and require less travel distance to retrieve as compared to less popular items).

FIG. 10 illustrates an exemplary method of storing relative amplitudes of networks 408 of a network signature 404 as a tensor 1004, according to an exemplary embodiment. In this embodiment, network signature 404 comprises six frequency bands (i.e., networks 408), however a network signature 404 may comprise more or fewer frequency bands. Measures 1002 of relative amplitude may be determined by, for any frequency band, taking the amplitude (i.e., signal strength) of the network 408 of the frequency band and dividing it by an amplitude of each of the other networks 408. The measures 1002 may be denoted as transforms $T_{j,k}$ of the tensor 1004 following equation 1 below:

$$T_{j,k} = \frac{A_j}{A_k} \qquad \text{(Equation 1)}$$

Index j corresponds to a row of the tensor 1004 and index k corresponds to a column. Values $A_j$ and $A_k$ correspond to amplitudes of networks 408-j and 408-k respectively, wherein j and k are integer numbers. As illustrated and according to equation 1 above, the measures 1002-1 through 1002-5 illustrated populate a first row of the tensor 1004. It is appreciated that $T_{j,k}$ is equal to a reciprocal of $T_{k,j}$ for any integers j and k. It is also appreciated that, based on equation 1 above, the diagonal of the tensor 1004 comprises only ones.

According to at least one non-limiting exemplary embodiment, the diagonal of the tensor 1004 may be populated using measurements of amplitudes of networks 408. For example, the first (i.e., leftmost) value of row one may be replaced with an amplitude measure of network 408-1, the second value of row two may be replaced with an amplitude measure of network 408-2, and so forth. According to at least one non-limiting exemplary embodiment, the tensor 1004 may further comprise additional rows or columns denoting amplitude measurements of each network 408 frequency band (e.g., dBm values).

According to at least one non-limiting exemplary embodiment, measures 1002 may comprise subtractions or other mathematical function instead of divisions.

Tensor 1004 may be a numeric representation of a network signature 404 for a given region 402 of a discretized coverage map. Tensor 1004 may be denoted as $[S_{n,m}]$ corresponding to a network signature 404 of a region 402 at location (n, m) on a discretized coverage map, n and m being integer numbers analogous to x and y coordinate values of a Cartesian plane. For example, referring to FIG. 4A above, a region 402 on the bottom left corner of the discretized coverage map (i.e., near origin 306) may comprise (n, m) values of (0,0), the adjacent region 402 to the right may comprise (n, m) values of (1, 0), and so forth. Upon a server 202 receiving a network signature 404 from a device, the server 202 may represent the received network signature 404 as a tensor 1004 denoted as $[S_{in}]$ using equation 1 above. The server 202 may utilize equation 2 below to determine one region 402 comprising a tensor 1004 of a region 402 at location (n, m) on a discretized coverage map.

$$(n, m) = \operatorname{argmin}_{n,m}([S_{n,m}] \cdot [S_{in}]) \qquad \text{(Equation 2)}$$

Coordinates (n, m) minimize a dot product between any $[S_{n,m}]$ of any region 402 and $[S_{in}]$ of the network signature from the device for all n and m values. That is, each tensor 1004 of each region 402 of the coverage map is dotted with $[S_{in}]$, wherein a server 202 may localize the device in a region 402 comprising a minimum of all of the dot products. It is appreciated that FIG. 10 illustrates an exemplary method of measuring relative amplitudes of network signal strength for various networks of a network signature 404 in a way such that the tensors 1004 for each network signature 404 may be easily sorted and parsed by a processor 130 of a server 202, however the equations 1 and 2 above are intended to be illustrative of broader methods for measuring relative amplitude and are not intended to be limiting.

Figure 11:
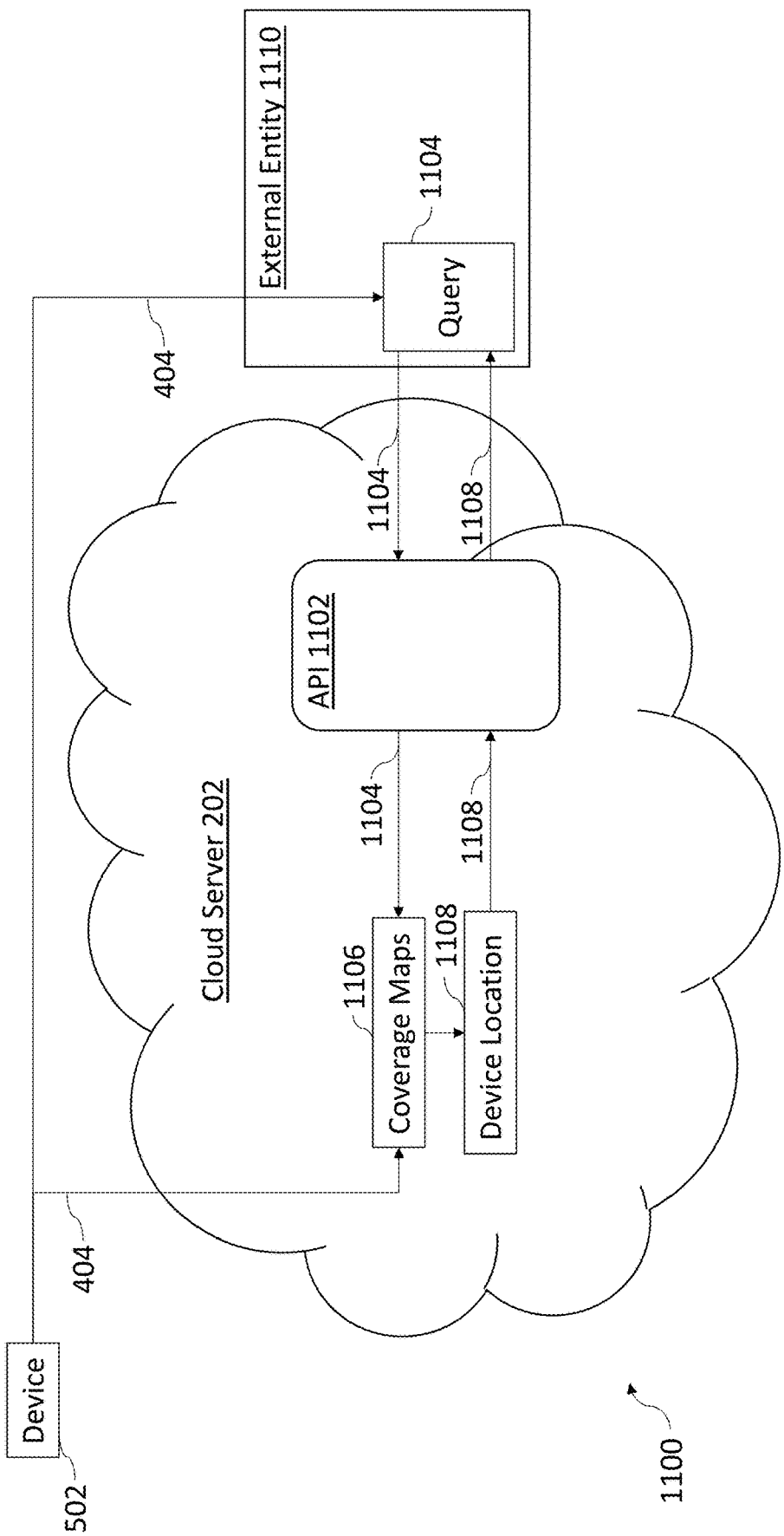
FIG. 11 is a functional block diagram illustrating a cloud server utilizing an application programming interface (API) to localize a device based on a query and a received network signature, according to an exemplary embodiment.

FIG. 11 is a functional block diagram illustrating a system 1100 configured to receive a query 1104 from an external entity 1110, the query 1104 comprising a request for a location of a device 502 based on a network signature 404 received from the device, according to an exemplary embodiment. Device 502 may comprise any Wi-Fi and/or cellular-enabled device such as, for example, a cell phone, a robot 102, an IoT device, tablet, ("smart") watch, and/or any other device capable of measuring a network signature 404 and communicating the network signature 404 to the server 202 and external entity 1110. External entity 1110 may comprise any computerized and/or human entity separate from the server 202 such as, for example, a computerized application (e.g., a separate cloud server), a company (e.g., analytics company), a robot 102 not coupled to the server 202, and/or any other entity capable of communicating with the device 502 and server 202. External entity 1110 may receive the network signature 404 from the device 502 at a current location of the device 502 (e.g., external entity 1110 may host an application running on the device 502, wherein the application communicates the network signature 404 to the external entity 1110). The external entity 1110 may input a query 1104 to the server 202, the query 1104 comprising a request to localize the device 502 based on the received network signature 404 from the device 502. Accordingly, the external entity 1110 may output the network signature 404 to the server 202 as part of the query 1104, wherein the server 202 may respond with the device location 1108.

Server 202 may comprise a plurality of coverage maps 1106 for a plurality of respective environments in which robots 102 coupled to the server 202 (e.g., as illustrated in FIG. 2 above) operate. Using the systems and methods illustrated above, the server 202 may localize the network signature 404 to a device location 1108. The device location comprised of an (x, y) position on a coverage map corresponding to a region 402 within which the network signature 404, and thereby the device 502 (i.e., (n, m) values of equation 2 above) is localized. Accordingly, the server 202 may respond to the query 1104 from the external entity 1110, the response comprising the location of the device 502 based on the coverage maps 1106.

Server 202 may further comprise an application programming interface (API) 1102 configured to interface the server 202 with the external entity 1110. The API 1102 may be configured to, in part, receive the query 1104 from the external entity 1110, determine if the server 202 should respond to the query 1104, and accordingly effectuate communication of the response to the query 1104 with the desired information (e.g., a location of the device 502). The API 1102 may determine if the server 202 should respond to the query 1104 based on, for example, a set of permissions. For example, the API 1102 may determine to respond to a query 1104 if the query 1104 arrives from a reputable external entity 1110 (e.g., an entity 1110 which pays a fee, is granted permission by host 204, and/or for any other reason). API 1102 may output queries 1104 received by external entity 1110 to the processor, or distributed network of processors, of the server 202 such that the processor(s) may process the query 1104 accordingly. The API 1102 may receive processed data (e.g., device location 1108 based on a network signature 404) from the processor(s) of the server 202 and correspondingly output the processed data to the external entity 1110.

Advantageously, use of API 1102 to interface between server 202 and external entity 1110 may enhance data security by preventing an external entity 1110 from accessing coverage maps 1106 stored within the server 202 while still granting access, if permitted (e.g., by host 204 of server 202), to the device location 1108 to the external entity 1110 using the coverage maps 1106. For example, an owner of a store may desire for the server 202 to not communicate detailed coverage maps of his/her store (e.g., for privacy or security reasons), however the owner of the store may grant permission for one or more external entities 1110 (e.g., one or more applications on a mobile phone, one or more analytics companies, etc.) to localize devices within his/her store using coverage maps generated by robots 102 operating therein (e.g., to enhance customer experience). Additionally, the API 1102 may be further configured by a host 204 or other operator(s) of the server 202 to grant or restrict access to data collected by robots 102 coupled to the server 202, thereby further enhancing data security by effectuating control of data flow into and out of the server 202.

It is appreciated by one skilled in the art that representing a network signature 404 in a tensor or other numerical data structure may further enhance a rate at which a server 202 may receive a network signature 404 from a device and localize the device based on numeric calculations, which may be performed quickly using a distributed network of processors discussed above. One skilled in the art may appreciate that a tensor 1004 may represent a network signature 404 in a plurality of similar or different manners, wherein equations 1 and 2 above are illustrative of broader innovative concepts of this disclosure and not intended to be limiting. Further, representing a network signature 404 using a tensor 1004, or other data structure which may be indexed and quickly searched (e.g., k-d trees), comprising measures 1002 of relative amplitude may further enhance a uniqueness for each network signature 404 associated with each region 402, thereby improving localization of the device by reducing a probability that two or more network signatures 404 of two or more respective regions 402 are the same.

According to at least one non-limiting exemplary embodiment, robots 102 of this disclosure configured to produce network signature measurements 308 may be configured to other purposes. For example, the robots 102 described herein may include, without limitation, cleaning robots (e.g., vacuums, floor scrubbers, floor polishers, sweepers, dusters, robots configured to disinfect an environment using sprays, ultraviolet light, etc.), item delivery/transport robots, robots configured to scan shelves/displays (e.g., to detect items on the shelves for inventory tracking), and/or other types of robots. These robots 102 may collect measurements 308 while executing their routine functions. For example, measurements 308 may be collected by a floor scrubbing robot 102 while the robot 102 cleans the floors. That is, the systems and methods of the present disclosure may leverage existing robots 102 to provide the server 202 with a substantially large data set of measurements 308 to produce a plurality of temporally accurate coverage maps useful for localizing devices without requiring the robots 102 to deviate from their assigned duties. In some embodiments, robots 102 configured to produce measurements 308 for server 202 may be configured by a human (e.g., via user interface units 112) to navigate a route and/or explore an environment (e.g., using an area fill pattern) for the purpose of collecting measurements 308.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation"; the term 'includes" should be interpreted as "includes but is not limited to"; the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A system for localizing devices, comprising:
a non-transitory computer readable storage medium comprising a plurality of computer readable instructions stored thereon; and
at least one processor configured to execute the plurality of computer readable instructions to,
receive a coverage map of an environment, the coverage map being generated based on data from sensor units of a robot, the sensor units include at least localization and navigation units, the sensor units are configured to detect objects and measure network signatures, the coverage map being a digital representation of the environment, the coverage map is discretized into a plurality of regions, each region comprising an associated network signature,
receive from a device a network signature associated with the device,
determine a region of the coverage map comprising a network signature that matches the associated network signature received from the device,
localize the device to the determined region within the environment based on the coverage map,
transmit a signal to the device upon localization of the device, the signal is based on at least one of a position of the device within the environment and the trajectory of the device, the signal comprising at least one of: (i) information related to either an object or a feature proximate, based on the coverage map, to the determined region within the environment, and (ii) directions to another location in the environment, and
determine a trajectory of the device based on a spatial and temporal difference between the first and second regions and the first and second times.

2. The system of claim 1, wherein the at least one processor is further configured to execute the plurality of computer readable instructions to,
localize the device within a first region within the environment at a first time;
localize the device within a second region within the environment at a second time, the second time is different from the first time; and
determine a trajectory of the device based on a spatial and temporal difference between the first and second regions and the first and second times.

3. The system of claim 1, wherein,
the network signatures comprise at least in part a measure of amplitudes of at least one of one or more Wi-Fi networks or cellular network within the environment.

4. The system of claim 3, wherein,
the network signatures further comprise a measure of relative amplitudes of the at least one of the one or more Wi-Fi networks or cellular networks within the environment.

5. The system of claim 1, wherein,
the network signatures comprise a network identification, or service set ID (SSID), associated with each respective network of the network signature.

6. The system of claim 1, further comprising:
an application programming interface (API) configured to interface between one or more external entities and the at least one processor, the interfacing comprising of the API receiving queries from the one or more external entities.

7. The system of claim 6, wherein,
the received queries from the one or more external entities comprise a request for a location of the device based on a network signature received by the device, the location of the device is based on the coverage maps generated by the at least one robot.

8. A method for localizing devices, comprising:
receiving a coverage map of an environment, the coverage map being generated based on data from sensor units of a robot, the sensor units include at least localization and navigation units, the sensor units are configured to detect objects and measure network signatures, the coverage map being a digital representation of the environment, the coverage map is discretized into a plurality of regions, each region comprising an associated network signature;
receiving from a device a network signature associated with the device;
determining a region of the coverage map comprising a network signature that matches the associated network signature received from the device;
localizing the device to the determined region within the environment based on the coverage map;
transmitting a signal to the device upon localization of the device, the signal is based on at least one of a position of the device within the environment and the trajectory of the device, the signal comprising at least one of: (i) information related to either an object or a feature proximate, based on the coverage map, to the determined region within the environment, and (ii) directions to another location in the environment, and
determine a trajectory of the device based on a spatial and temporal difference between the first and second regions and the first and second times.

9. The method of claim 8, further comprising:
localizing the device within a first region within the environment at a first time;
localizing the device within a second region within the environment at a second time, the second time being after the first time; and
determining a trajectory of the device based on a spatial and temporal difference between the first and second region and first and second times.

10. The method of claim 8, wherein,
the network signatures comprise at least in part a measure of amplitudes of at least one of one or more Wi-Fi networks or cellular network within the environment.

11. The method of claim 10, wherein,
the network signatures further comprise a measure of relative amplitudes of the at least one of the one or more Wi-Fi networks or cellular networks within the environment.

12. The method of claim 8, wherein,
the network signatures comprise a network identification, or service set ID (SSID) associated with each network of the network signature.

13. The method of claim 8, further comprising: utilizing an application programming interface (API) configured to interface between one or more external entities and the at least one processor, the interfacing comprising of the API receiving queries from the one or more external entities.

14. The method of claim 13, wherein,
the received queries from the one or more external entities comprise a request for a location of the device based on a network signature received by the device, the location of the device being based on the coverage maps generated by the at least one robot.

15. A non-transitory computer readable storage medium comprising a plurality of computer readable instructions stored thereon, that when executed by a processor, configure the processor to,
receive a plurality of measurements of network signatures from one or more robots within an environment, the measurements comprising a measure of signal strength for at least one network within the environment, the measurements being collected by one or more sensors coupled to the one or more respective robots, the received measurements being localized to a position of the robot during acquisition of the respective measurements;
generate a coverage map for the environment based on the received measurements, the coverage map comprising a map of network signatures of a device within the environment, the coverage map being generated based on data from sensor units of the one or more robots, the sensor units comprises at least localization and navigation units, the sensor units are configured to detect objects and measure network signatures, the coverage map being a digital representation of the environment, the coverage map is discretized into a plurality of regions, each region comprising an associated network signature;
localize the device to the determined region within the environment based on the coverage map;
transmit a signal to the device upon localization of the device, the signal is based on at least one of a position of the device within the environment and the trajectory of the device, the signal comprising at least one of: (i) information related to an object or feature proximate, based on the coverage map, to the determined region within the environment, and (ii) directions to another location in the environment, and
determine a trajectory of the device based on a spatial and temporal difference between the first and second regions and the first and second times.

16. The non-transitory computer readable storage medium of claim 15, wherein the processor is further configured to execute the plurality of computer readable instructions to,
receive from a device a network signature associated with the device, the network signature associated with the device comprising at least in part a measure of network signal strength for one or more networks;
discretize the coverage map into a plurality of regions, each region comprising an associated network signature based on the received measurements from the one or more robots; and
localize the device based on determining one or more regions comprises a network signature that matches to the network signature associated with the device.

17. The non-transitory computer readable storage medium of claim 16, wherein the processor is further configured to execute the plurality of computer readable instructions to,
localize the device to a first location at a first time;
localize the device to a second location at a second time, the first time being different from the second time; and
determine a trajectory of the device based on a spatial difference between the first and second locations and a temporal difference between the first and second times.

* * * * *